US011923972B2

(12) United States Patent
Babich et al.

(10) Patent No.: US 11,923,972 B2
(45) Date of Patent: Mar. 5, 2024

(54) COMMUNICATION SYSTEM AND METHOD WHERE MESSAGE LENGTH IS ASSIGNED BASED ON MESSAGE PREFERENCE

(71) Applicant: Skywave Networks LLC, Chicago, IL (US)

(72) Inventors: Kevin J. Babich, Valparaiso, IN (US); Terry Lee Vishloff, Anmore (CA)

(73) Assignee: Skywave Networks LLC, Chicago, IL (US)

( * ) Notice: Subject to any disclaimer, the term of this patent is extended or adjusted under 35 U.S.C. 154(b) by 0 days.

(21) Appl. No.: 17/806,444

(22) Filed: Jun. 10, 2022

(65) Prior Publication Data

US 2023/0144207 A1 May 11, 2023

Related U.S. Application Data

(63) Continuation of application No. 15/929,161, filed on Nov. 14, 2019, now Pat. No. 11,374,679.

(Continued)

(51) Int. Cl.
*H04L 1/00* (2006.01)
*G06N 7/01* (2023.01)
(Continued)

(52) U.S. Cl.
CPC ............ *H04L 1/0007* (2013.01); *G06N 7/01* (2023.01); *G06Q 40/04* (2013.01); *H04B 7/22* (2013.01);
(Continued)

(58) Field of Classification Search
CPC ... H04L 1/0007; H04L 1/1812; H04L 1/0009; H04L 1/0018; H04L 1/0003;
(Continued)

(56) References Cited

U.S. PATENT DOCUMENTS 8,321,326 B2 * 11/2012 Auerbach .............. G06Q 40/04 705/37
9,136,938 B1 9/2015 Babich
(Continued)

FOREIGN PATENT DOCUMENTS

WO 2000041360 A1 7/2000
WO WO-0169432 A2 * 9/2001 ........... G05B 19/404

OTHER PUBLICATIONS

Arikan, Toros, Thesis—Minimum-Delay HF Communications, University of Illinois at Urbana-Champaign Retrieved from the Internet: https://www.ideals.illinois.edu/bitstream/handle/2142/97507/ARIKAN-THESIS-2017.pdf?sequence=1, 60 pages, Nov. 28, 2017.
(Continued)

*Primary Examiner* — Jael M Ulysse
(74) *Attorney, Agent, or Firm* — Woodard, Emhardt, Henry, Reeves & Wagner, LLP

(57) ABSTRACT

A method and communication system has been developed to increase the number of messages sent over a bandwidth limited channel and/or under noisy conditions by using a variable message length encoding and decoding scheme. With this technique, the messages having a higher probability of being sent are shorter as compared to the messages that are less likely to be sent under the current conditions. With this technique, a higher number of transactions per unit of time can be communicated and/or executed over a given bandwidth limited channel. When the transmitted message is received, the receiver does not know the message length, but the receiver deduces the length by using information from various error detection and correction techniques, such as forward error correction (FEC) and cyclic redundancy check (CRC) techniques.

19 Claims, 12 Drawing Sheets

Related U.S. Application Data

(60) Provisional application No. 62/767,211, filed on Nov. 14, 2018.

(51) Int. Cl.
*G06Q 40/04* (2012.01)
*H04B 7/22* (2006.01)
*H04W 28/08* (2023.01)

(52) U.S. Cl.
CPC .......... *H04L 1/0003* (2013.01); *H04L 1/0009* (2013.01); *H04L 1/0018* (2013.01); *H04L 1/0038* (2013.01); *H04L 1/0061* (2013.01); *H04W 28/0958* (2020.05)

(58) Field of Classification Search
CPC ... H04W 28/0958; G06N 7/005; G06Q 40/04; H04B 7/22
See application file for complete search history.

(56) References Cited

U.S. PATENT DOCUMENTS

| | | | | |
|---|---|---|---|---|
| 2002/0042836 | A1* | 4/2002 | Mallory ................ | H04L 1/0025<br>709/240 |
| 2002/0131532 | A1 | 9/2002 | Chi et al. | |
| 2004/0042506 | A1 | 3/2004 | Fallon et al. | |
| 2004/0143636 | A1* | 7/2004 | Horvitz ................ | H04L 51/212<br>709/207 |
| 2006/0129473 | A1 | 6/2006 | Hansen et al. | |
| 2007/0150631 | A1* | 6/2007 | Druke ................ | H04L 47/6215<br>710/244 |
| 2007/0183493 | A1* | 8/2007 | Kimpe ................ | H04N 19/172<br>375/E7.181 |
| 2007/0268823 | A1* | 11/2007 | Madison ............. | H04L 47/2441<br>370/229 |
| 2008/0109707 | A1 | 5/2008 | Dell et al. | |
| 2011/0066539 | A1* | 3/2011 | Auerbach .............. | G06Q 40/04<br>705/37 |
| 2011/0099449 | A1 | 4/2011 | Li et al. | |
| 2012/0011252 | A1* | 1/2012 | Alperovitch ........ | H04L 47/2458<br>709/224 |
| 2013/0232273 | A1* | 9/2013 | Lawn .................... | H04L 67/141<br>709/228 |
| 2013/0268657 | A1* | 10/2013 | Cormode .............. | H04L 43/022<br>709/224 |
| 2014/0086588 | A1 | 3/2014 | Kawanishi et al. | |
| 2015/0009409 | A1* | 1/2015 | Ikushima ................ | H04L 27/02<br>348/724 |
| 2015/0244632 | A1* | 8/2015 | Katar ....................... | H04B 3/54<br>370/230 |
| 2016/0352463 | A1* | 12/2016 | Vojcic ................. | H04L 27/2649 |
| 2017/0230994 | A1* | 8/2017 | You ....................... | H04L 5/0053 |
| 2017/0332386 | A1* | 11/2017 | Li ..................... | H04W 72/0446 |
| 2017/0366553 | A1* | 12/2017 | Shetye .................. | H04W 12/08 |
| 2018/0069668 | A1* | 3/2018 | Jorgensen ............. | H04W 28/20 |
| 2018/0175958 | A1* | 6/2018 | Fredriksson ........ | H04L 12/4135 |
| 2018/0198894 | A1* | 7/2018 | Nammi ................. | H04L 47/821 |
| 2020/0244352 | A1 | 7/2020 | Babich | |
| 2020/0328844 | A1 | 10/2020 | Babich et al. | |
| 2020/0328918 | A1 | 10/2020 | Babich et al. | |
| 2020/0328919 | A1 | 10/2020 | Babich et al. | |
| 2020/0366367 | A1 | 11/2020 | Babich | |
| 2021/0058150 | A1 | 2/2021 | Babich | |
| 2021/0058151 | A1 | 2/2021 | Babich | |
| 2021/0067239 | A1 | 3/2021 | Babich | |
| 2021/0075494 | A1 | 3/2021 | Babich | |
| 2021/0075502 | A1 | 3/2021 | Babich | |
| 2021/0075562 | A1 | 3/2021 | Babich | |
| 2021/0075584 | A1 | 3/2021 | Babich | |
| 2021/0105044 | A1 | 4/2021 | Babich | |

OTHER PUBLICATIONS

PCT, Intl. App. No. PCT/US2019/070006 International Search Report, 5 pages, dated Sep. 15, 2020.

PCT, Intl. App. No. PCT/US2019/070006 Written Opinion of the International Searching Authority, 7 pages, dated Sep. 15, 2020.

Huffman, Proceedings of the I.R.E Method for the Construction of Minimum-Redundancy Codes, 4 pages, Sep. 1, 1952.

Rudberg et al., Implementation of a fast MPEG-2 compliant Huffman decoder, 4 pages, Sep. 10, 1996.

EP, European Patent Application 19884325.2 Extended European Search Report, 9 pages, dated Jul. 8, 2022.

EP, European Patent Application No. 2108476.9 Examination Report, 7 pages, dated Feb. 17, 2023.

* cited by examiner

800

Example #1 Table Structure

| Message Probability Group | Message Length (in units of M-bits) |
|---|---|
| 1 | 1 |
| 2 | 2 |
| 3 | 3 |
| . | . |
| . | . |
| . | . |
| Z | Z |

Example #1 with M=8

| Message Probability Group | Message Length (bits) | Number of messages |
|---|---|---|
| 1 | 8 | 256 |
| 2 | 16 | 65,536 |
| 3 | 24 | 16,777,216 |
| 4 | 32 | 4,294,967,296 |
| 5 | 40 | 1.09951E+12 |

Example #2 Table Structure

| Message Probability Group | Message Length (in units of M-bits) |
|---|---|
| 1 | $2^0$ |
| 2 | $2^1$ |
| 3 | $2^2$ |
| . | . |
| . | . |
| . | . |
| Z | $2^{Z-1}$ |

*Fig. 10*

COMMUNICATION SYSTEM AND METHOD WHERE MESSAGE LENGTH IS ASSIGNED BASED ON MESSAGE PREFERENCE

CROSS REFERENCE TO RELATED APPLICATIONS

This application is a continuation of U.S. patent application Ser. No. 15/929,161, filed Nov. 14, 2019, which is hereby incorporated by reference. U.S. patent application Ser. No. 15/929,161, filed Nov. 14, 2019, claims the benefit of U.S. Patent Application No. 62/767,211, filed Nov. 14, 2018, which are hereby incorporated by reference.

BACKGROUND

Typical over the air (OTA) radio transmissions can have significant latencies when transmitted over long distances such as across oceans. Moreover, these transmission channels can be rather noisy which in turn increases the need for error correction. This additional error correction information typically increases the size of the message. High frequency (HF) radio communication channels of most long-distance communication systems are limited by the available assigned radio bandwidth and channel capacity at any given time. When using the HF radio channel in a financial high-frequency trading application, increasing the number of messages increases the profit potential of the system.

Thus, there is a need for improvement in this field.

SUMMARY

A unique method and communication system has been developed to increase the number of messages sent over a bandwidth limited channel and/or under noisy conditions by using a variable message length encoding and decoding scheme in which the messages that have the higher probability of being sent are shorter as compared to the messages that are less likely to be sent under the current conditions. In other words, the message length increases as the expected probability of the message being sent is lower. By way of analogy, words in the English language (as well as other languages) that are commonly used, such as “a” and “the”, are typically shorter than words that are used less often like “Mississippi.” With this encoding scheme, the number of messages that can be sent on average over a particular channel can be increased.

This technique can be especially helpful in high latency conditions where the channels have limited bandwidth. Some non-limiting examples include worldwide communications across or between continents, transoceanic communications, aircraft communications, and spacecraft communications. For instance, this technique can be helpful in controlling remote spacecraft probes that have high latency and low bandwidth communication conditions where communication timing is critical. In other examples, this method can be used for communicating with submerged submarines, satellites, and remote surgical robots. Other use case examples include trading financial instruments. This technique and system can be used in other fields such as providing news and/or remotely controlling equipment.

Typical OTA radio transmissions can have significant latencies when transmitted over long distances such as across oceans. Moreover, these transmission channels can be rather noisy which in turn increases the need for error correction. This additional error correction information typically increases the size of the message. This unique method has been developed to increase the number of messages sent over such radio channels by using variable length messages where the types of messages having the higher probability of being transmitted are shorter than those with a lower probability of being used to make a trade or perform some other transaction. With this technique, a higher number of transactions per unit of time can be communicated and/or executed over a given bandwidth limited channel. When the transmitted message is received, the receiver does not know the message length, but the receiver deduces the length by using information from various error detection and correction techniques, such as forward error correction (FEC) and cyclic redundancy check (CRC) techniques.

It should be appreciated that the system and methods described herein address several issues. For instance, by using a table of variable length messages where the shortest messages are the most probable or common, a larger number of messages can be communicated over a limited bandwidth channel over a period of time as compared to a set of constant length messages that need to cover all possibilities. Support for variable length messages at the baseband level allows mixing of message lengths as will occur when the modems change operating modes which may be done independently of the baseband processing portion of the system. It is practical to use the message code table definitions to include variable levels of error control so that message security and accuracy can be adjusted according to message impact in case of false detection or error. This extra protection may be included directly into the translation table or may be implemented by adding additional FEC protection in the modem. Compression of some messages into shorter messages also provides the possibility of increasing the error overhead, and thus, it provides more error protection for such messages.

The system and techniques as described and illustrated herein concern a number of unique and inventive aspects. Some, but by no means all, of these unique aspects are summarized below.

Aspect 1 generally concerns a method that includes communicating messages having variable lengths over a communication channel.

Aspect 2 generally concerns the method of any previous aspect which includes creating a message code table that includes message groups with different message lengths.

Aspect 3 generally concerns the method of any previous aspect which includes assigning higher preference messages to shorter message length groups and lower preference messages to longer message length groups.

Aspect 4 generally concerns the method of any previous aspect in which the preference is based at least on probability that the message will be sent.

Aspect 5 generally concerns the method of any previous aspect in which the preference is based at least on financial benefit of the message.

Aspect 6 generally concerns the method of any previous aspect which includes communicating the message code table to a receiver for the messages.

Aspect 7 generally concerns the method of any previous aspect which includes transmitting the message code table over a high latency, high bandwidth channel.

Aspect 8 generally concerns the method of any previous aspect in which the message code table is created in at least part by a computer at a transmitter.

Aspect 9 generally concerns the method of any previous aspect in which the message code table is created in at least part by a computer at a receiver.

Aspect 10 generally concerns the method of any previous aspect which includes selecting a financial trading strategy.

Aspect 11 generally concerns the method of any previous aspect which includes developing a set of possible trading commands based on the financial trading strategy.

Aspect 12 generally concerns the method of any previous aspect which includes estimating probabilities that the possible trading commands will be issued.

Aspect 13 generally concerns the method of any previous aspect which includes assigning highest probability trading commands to a shortest message group.

Aspect 14 generally concerns the method of any previous aspect which includes assigning next priority commands to a next longer message group that has message lengths longer than the shortest message group.

Aspect 15 generally concerns the method of any previous aspect which includes transmitting the messages using a low latency, low bandwidth channel.

Aspect 16 generally concerns the method of any previous aspect which includes communicating the messages using skywave propagation.

Aspect 17 generally concerns the method of any previous aspect in which the communication channel includes a primary channel.

Aspect 18 generally concerns the method of any previous aspect in which the primary channel includes a high frequency radio channel.

Aspect 19 generally concerns the method of any previous aspect in which the communication channel includes a backend channel.

Aspect 20 generally concerns the method of any previous aspect which includes encoding the messages with the variable lengths with at least an error correction code.

Aspect 21 generally concerns the method of any previous aspect in which the messages with the variable lengths include at least forward error correction (FEC).

Aspect 22 generally concerns the method of any previous aspect in which the messages with the variable lengths include at least a checksum.

Aspect 23 generally concerns the method of any previous aspect in which the messages with the variable lengths include at least a cyclic redundancy check (CRC).

Aspect 24 generally concerns the method of any previous aspect which includes appending a newly received symbol for one of the messages to previously received symbols.

Aspect 25 generally concerns the method of any previous aspect which includes decoding one of the messages using forward error correction (FEC).

Aspect 26 generally concerns the method of any previous aspect in which the determining one of the messages is valid based on a validity of a checksum for the message.

Aspect 27 generally concerns the method of any previous aspect which includes decoding the messages using forward error correction (FEC) and cyclic error correction (CRC).

Aspect 28 generally concerns the method of any previous aspect which includes decoding the messages in a serial manner by cycling through larger message groups.

Aspect 29 generally concerns the method of any previous aspect which includes decoding the messages in a parallel manner by analyzing all potential message group lengths simultaneously.

Aspect 30 generally concerns the method of any previous aspect which includes decoding the messages in which higher use probability messages are encoded to have a shorter length as compared to lower use probability messages.

Aspect 31 generally concerns the method of any previous aspect in which the messages concern one or more high-speed financial trading transactions.

Aspect 32 generally concerns the method of any previous aspect in which the message has a variable length.

Aspect 33 generally concerns the method of any previous aspect which includes decoding the messages without knowledge of length and timing of the message.

Aspect 34 generally concerns the method of any previous aspect which includes increasing error correction overhead for the messages.

Aspect 35 generally concerns the method of any previous aspect which includes providing higher degree of error protection by increasing error correction overhead.

Aspect 36 generally concerns the method of any previous aspect which includes reducing false positive detection by increasing error correction overhead.

Aspect 37 generally concerns the method of any previous aspect which includes encoding higher preference messages to shorter message length groups and lower preference messages to longer message length groups.

Aspect 38 generally concerns a method of increasing the number of possible messages traversing a bandwidth-constrained radio communications system by creating message translation tables where after translation higher probability messages output from the table have a shorter length than the lower probability messages.

Aspect 39 generally concerns the method of any previous aspect in which the messages contain data related to high-speed financial trading transactions.

Aspect 40 generally concerns the method of any previous aspect in which the error correction overhead is increased for messages requiring a higher degree of protection from errors and/or false positive detection.

Aspect 41 generally concerns a method for the detection of variable length messages without a-priori knowledge of the message length, nor timing.

Aspect 42 generally concerns the method of any previous aspect in which the messages contain data related to high-speed financial trading transactions.

Aspect 43 generally concerns the method of any previous aspect in which the error correction overhead is increased for messages requiring a higher degree of protection from errors and/or false positive detection.

Aspect 44 generally concerns a system for performing the method of any previous aspect.

Further forms, objects, features, aspects, benefits, advantages, and embodiments of the present invention will become apparent from a detailed description and drawings provided herewith.

BRIEF DESCRIPTION OF THE DRAWINGS

FIG. 8 is a diagrammatic view of a first example of a message group table structure.

FIG. 9 is a diagrammatic view of a specific example for the FIG. 8 message group table structure.

FIG. 10 is a diagrammatic view of a second example of a message group table structure.

DETAILED DESCRIPTION OF SELECTED EMBODIMENTS

Figure 1:
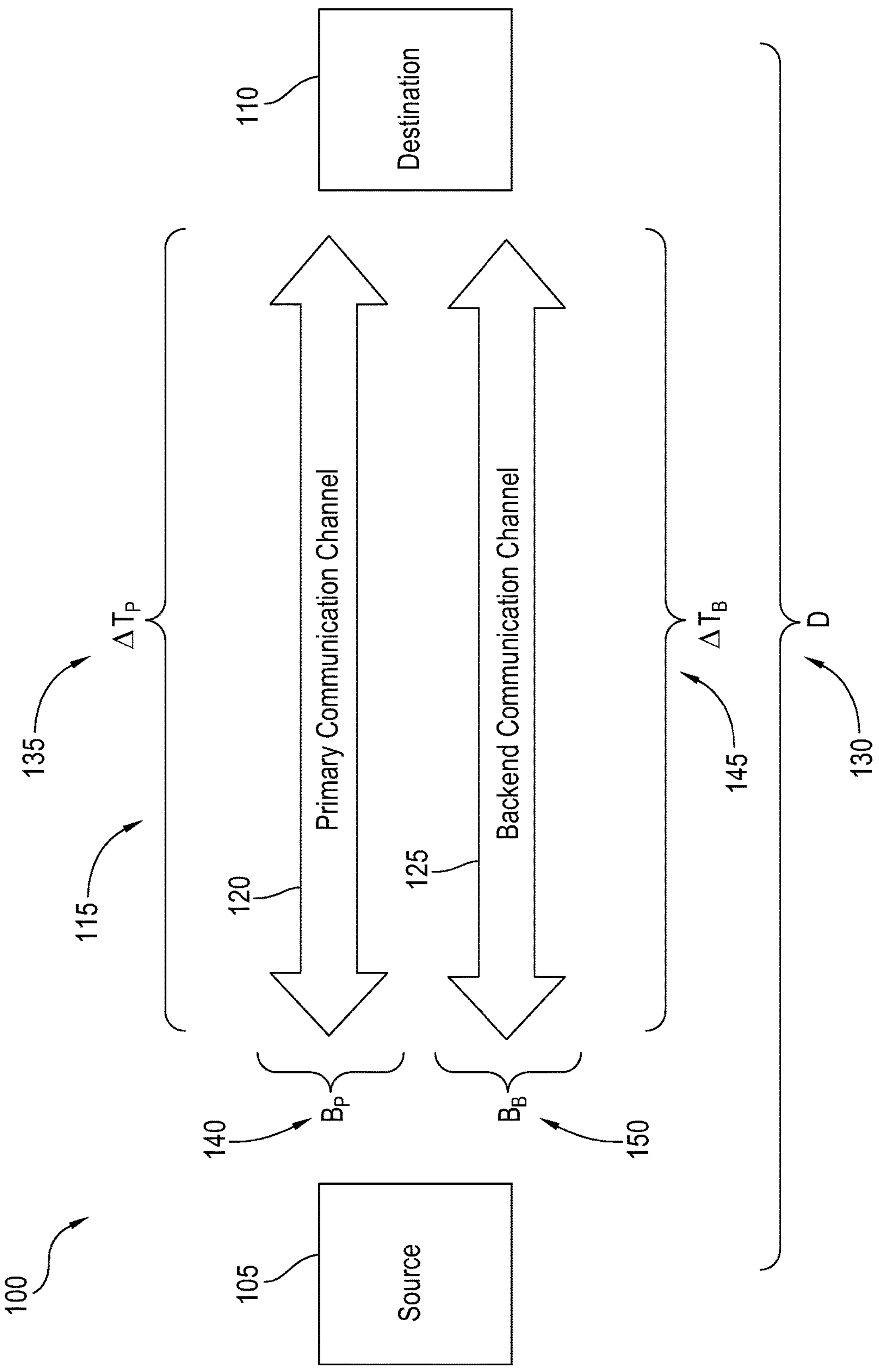
FIG. 1 is a diagrammatic view of a communication system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a generic version of a communication system 100 according to one example. As shown, the communication system 100 includes an information source 105 and an information destination 110. The information source 105 and information destination 110 operatively communicate with one another through one or more communication channels 115. Communication over these communication channels 115 can be one-way type communications and/or two-way type communications. In the illustrated example, the communication channels 115 between the information source 105 and information destination 110 include a primary communication channel 120 and a backend communication channel 125. In other examples, the communication system 100 can include just a single communication channel 115 or more than two communication channels 115.

As will be explained in further detail below, the communication system 100 can be used in a number of situations, especially in situations where the information source 105 and information destination 110 are located physically remote from one another. The communication system 100 for instance can be used for private, commercial, medical, military, and/or governmental purposes. For the purposes of explanation, the communication system 100 will be described for use with a financial trading system, but it should be recognized that the communication system 100 can be adapted for other uses such as for issuing military commands and performing remote telemedicine procedures. In this example, the information source 105 and information destination 110 generally represent the locations of the computer systems for remotely located stock/commodity exchanges and/or financial institutions that trade on those exchanges. Some examples of these exchanges include the New York Stock Exchange (NYSE), the NASDAQ Stock Market, Tokyo Stock Exchange (TYO), the Shanghai Stock Exchange, the Hong Kong Stock Exchange, Euronext, London Stock Exchange, Shenzhen Stock Exchange, Toronto Stock Exchange, Bombay Stock Exchange, Chicago Mercantile Exchange (CME), Chicago Board of Trade (CBOT), and the New York Mercantile Exchange (NYMEX), just to name a few.

As shown in FIG. 1, the information source 105 and information destination 110 are physically separated by a distance ("D") 130. For instance, the exchanges represented by the information source 105 and information destination 110 can be separated by mountains, continents, and even oceans. This physical distance 130 creates a delay or latency in communications between the information source 105 and information destination 110 locations. Normally, but not always, the greater the distance 130, the longer the latency for a given communication channel 115. In most cases, the distance 130 between these exchanges prevents direct line of sight communications which further increases latency as well as increases the risk for communication errors. For instance, the information destination 110 can be located past the radio horizon for the information source 105. With trading as well as other activities, time and communication accuracy are crucial. Any delays can cause traders to lose money, and likewise, any communication errors can cause a loss. Communication errors can be reduced but usually at the cost of higher latency and/or greater bandwidth requirements. Most communication channels 115 have limited bandwidth to some degree. The latency and bandwidth capabilities can vary depending on the construction and type of communication channel 115.

As can be seen, the primary communication channel 120 has a primary channel latency ("$\Delta T_P$") 135 and a primary channel bandwidth ("$B_P$") 140. The backend channel latency 145 primary communication channel 120 has a backend channel latency ("$\Delta T_B$") 145 and a backend channel bandwidth ("$B_B$") 150. The communication channels 115 in FIG. 1 can have the same latency and bandwidth properties or different latency and/or bandwidth as well as other properties. In one example, the primary channel latency 135 of the primary communication channel 120 is less than the backend channel latency 145 of the backend communication channel 125, and the primary channel bandwidth 140 of the primary communication channel 120 is less than the backend channel bandwidth 150 of the backend communication channel 125. In some variations of this example, the primary communication channel 120 is a wireless communication channel (e.g., radio), and the backend communication channel 125 is a wired type communication channel (e.g., fiber optic cable). In one particular form, the primary communication channel 120 uses a skywave communication technique, and the backend communication channel 125 includes a non-skywave path such as a fiber optic cable. In other examples, the primary communication channel 120 and backend communication channel 125 represent different communication channels 115 for the same type of communication mode. For instance, primary communication channel 120 and backend communication channel 125 represent wireless communication channels having different frequency bands, and in one example, both communication channels 115 utilize high frequency (HF) radio to communicate via skywave propagation. With the primary communication channel 120 and backend communication channel 125 having different frequencies, the primary communication channel 120 and backend communication channel 125 can have different latencies, bandwidths, and/or communication error rates. For instance, the primary communication channel 120 in one situation can be noisier than the backend communication channel 125, but the primary communication channel 120 can have a shorter latency than the backend communication channel 125.

The HF radio communication channel 115 of the communication system 100 can be limited by the available assigned radio bandwidth and channel capacity at any given time. When using the HF radio communication channel 115 in a financial high frequency trading application, increasing the number of messages increases the profit potential of the communication system 100. As will be further explained below, a unique method has been developed to increase the number of messages sent over a bandwidth-limited wireless communication channel 115 by using variable length messages where the types of messages having the higher probability of being transmitted are shorter than those with a lower probability of being used to make a trade or perform some other transaction. With this technique, a higher number of transactions per unit of time can be communicated and/or executed. In the communication system 100, the receiver or information destination 110 does not need to know the message length, but the information destination 110 deduces the length by using information from various error detection and correction techniques, such as forward error correction (FEC) and cyclic redundancy check (CRC) techniques, with one or more decoder units. For practical reasons, the messages in one particular variation are aligned to be modulated symbol boundaries as determined by the modulation method used and the overhead associated with the FEC and CRC checksum.

Figure 2:
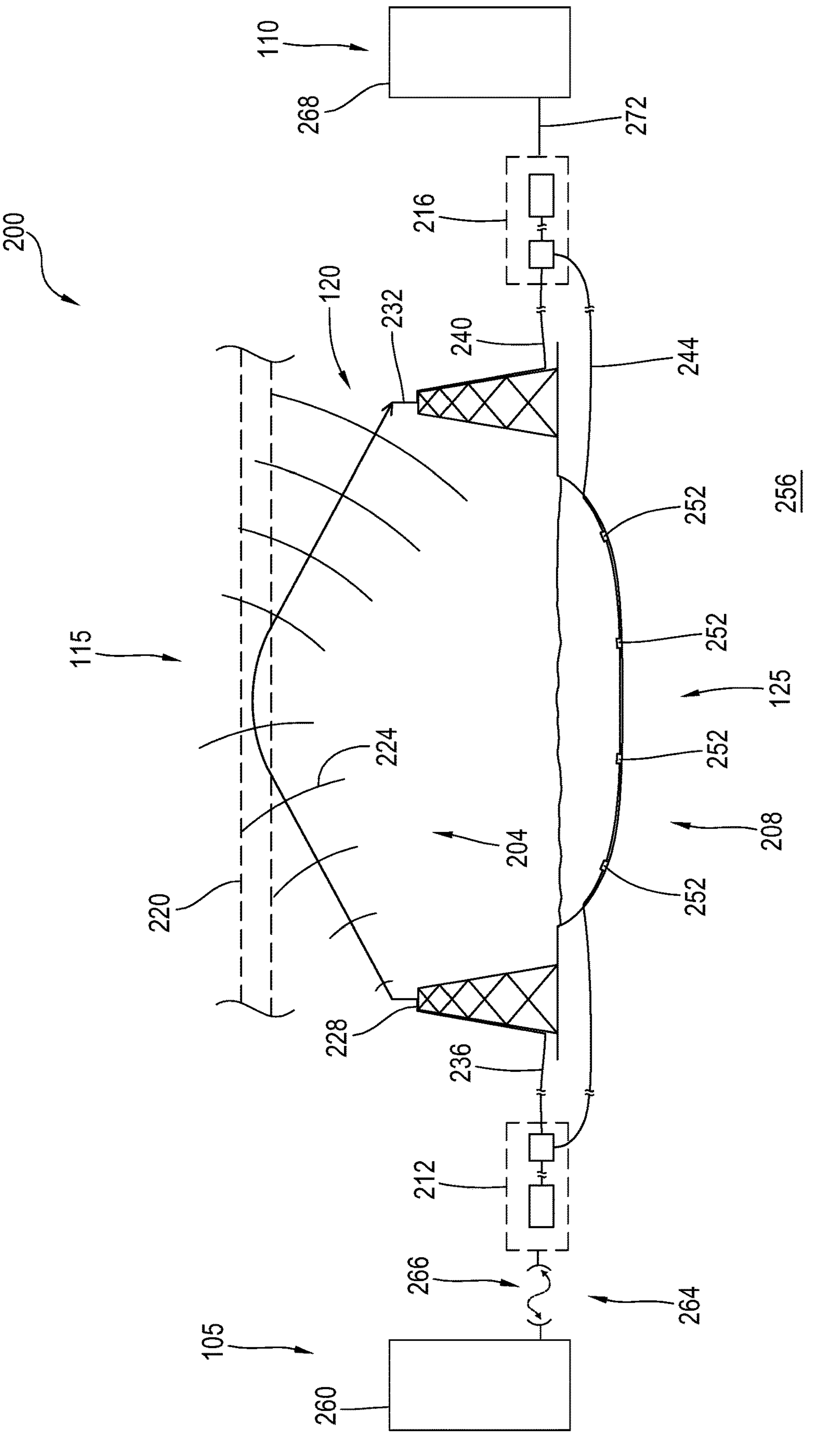
FIG. 2 is a diagrammatic view of a communication system according to another example.

FIG. 2 illustrates a specific example of a communication system 200 of the FIG. 1 communication system 100 configured to transfer data according to the unique technique described herein. Like in the FIG. 1 communication system 100, the communication system 200 in FIG. 2 includes the information source 105, information destination 110, and communication channels 115 that include the primary communication channel 120 and backend communication channel 125. Specifically, the communication system 200 in FIG. 2 is configured to transfer data via a low latency, low bandwidth communication link 204 and separate data via a high latency, high bandwidth communication link 208. The low latency, low bandwidth communication link 204 and high latency, high bandwidth communication link 208 provide separate connections between a first communication node 212 and a second communication node 216. The low latency, low bandwidth communication link 204 may be configured to transmit data using electromagnetic waves 224 passing through free space via skywave propagation between a transmitting antenna 228 and a receiving antenna 232. The electromagnetic waves 224 may be generated by a transmitter in the first communication node 212, passed along a transmission line 236 to the transmitting antenna 228. The electromagnetic waves 224 may be radiated by the transmitting antenna 228 encountering an ionized portion of the atmosphere 220. This radiated electromagnetic energy may then be refracted by the ionized portion of the atmosphere 220 causing the electromagnetic waves 224 to redirect toward the earth 256. The electromagnetic waves 224 may be received by the receiving antenna 232 coupled to the second communication node 216 by the transmission line 240. As illustrated in FIG. 2, a transmitting communication node may use skywave propagation to transmit electromagnetic energy long distances across the surface of the earth 256 without the need of one or more transmission lines 236 to carry the electromagnetic energy.

Data may also be transmitted between the first communication node 212 and second communication node 216 using the high latency, high bandwidth communication link 208. As illustrated in FIG. 2, the high latency, high bandwidth communication link 208 may be implemented using a transmission line 244 passing through the earth 256, which may include passing under or through an ocean or other body of water. As shown in FIG. 2, the high latency, high bandwidth communication link 208 may include one or more repeaters 252. FIG. 2 illustrates four repeaters 252 along the transmission line 244 although any suitable number of repeaters 252 may be used. The transmission line 244 may also have no repeaters 252 at all. Although FIG. 2 illustrates the low latency, low bandwidth communication link 204 transmitting information from the first communication node 212 to the second communication node 216, the data transmitted may pass along the low latency, low bandwidth communication link 204 and high latency, high bandwidth communication link 208 in both directions.

As shown, the communication system 200 further includes a client 260 that has a connection 264 to the first communication node 212. The client 260 is configured to send instructions over the connection 264 to the first communication node 212. In the illustrated example, the connection 264 includes a wireless connection 266 such as a microwave network. At the first communication node 212, the instructions are prepared to be sent to the second communication node 216, either by the low latency, low bandwidth communication link 204 or the high latency, high bandwidth communication link 208, or both. As shown, the second communication node 216 is connected to an instruction processor 268 via a connection 272. It should be recognized that the connection 272 can include wireless connection 266 like a microwave or other type of wireless connection. The client 260 may be any business, group, individual, and/or entity that desires to send directions over a distance. The instruction processor 268 may be any business, group, individual, and/or entity that is meant to receive or act upon those instructions. In some embodiments, the connection 264 and connection 272 may be unnecessary as the client 260 may send the data to be transmitted directly from the first communication node 212 or the second communication node 216 may be connected directly to the instruction processor 268. The communication system 200 may be used for any kind of low-latency data transmission that is desired. As one example, the client 260 may be a doctor or surgeon working remotely while the instruction processor 268 may be a robotic instrument for working on a patient.

In some embodiments, the client 260 may be a financial instrument trader and the instruction processor 268 may be a stock exchange. The trader may wish to provide instructions to the stock exchange to buy or sell certain securities or bonds at specific times. Alternatively or additionally, the instructions are in the form of news and/or other information supplied by the trader and/or a third party organization, such as a news organization or a government. The trader may transmit the instructions to the first communication node 212 which sends the instructions and/or news to the second communication node 216 using the transmitting antenna 228, receiving antenna 232, and/or by the transmission line 244. The stock exchange can then process the actions desired by the trader upon receipt of the instructions and/or news.

The communication system 200 may be useful for high-frequency trading, where trading strategies are carried out on computers to execute trades in fractions of a second. In high-frequency trading, a delay of mere milliseconds may cost a trader millions of dollars; therefore, the speed of transmission of trading instructions is as important as the accuracy of the data transmitted. In some embodiments, the trader may transmit preset trading instructions or conditions for executing a trade to the second communication node 216, which is located within close proximity to a stock exchange, using the high latency, high bandwidth communication link 208 at a time before the trader wishes to execute a trade. These instructions or conditions may require the transmission of a large amount of data, and may be delivered more accurately using the high latency, high bandwidth communication link 208. Also, if the instructions or conditions are sent at a time prior to when a trade is wished to be executed, the higher latency of the high latency, high bandwidth communication link 208 can be tolerated.

The eventual execution of the instructions may be accomplished by the trader transmitting triggering data to the communication system 200 on which the instructions are stored. Alternatively or additionally, the triggering data can includes news and/or other information supplied by the trader and/or a separate, third party organization. Upon receipt of the triggering data, the trading instructions are sent to the stock exchange and a trade is executed. The triggering data that is transmitted is generally a much smaller amount of data than the instructions; therefore, the triggering data may be sent over the low latency, low bandwidth communication link 204. When the triggering data is received at the second communication node 216, the instructions for a specific trade are sent to the stock exchange. Sending the triggering data over the low latency, low bandwidth communication link 204 rather than the high latency, high bandwidth communication link 208 allows the desired trade to be executed as quickly as possible, giving the trader a time advantage over other parties trading the same financial instruments.

Figure 3:
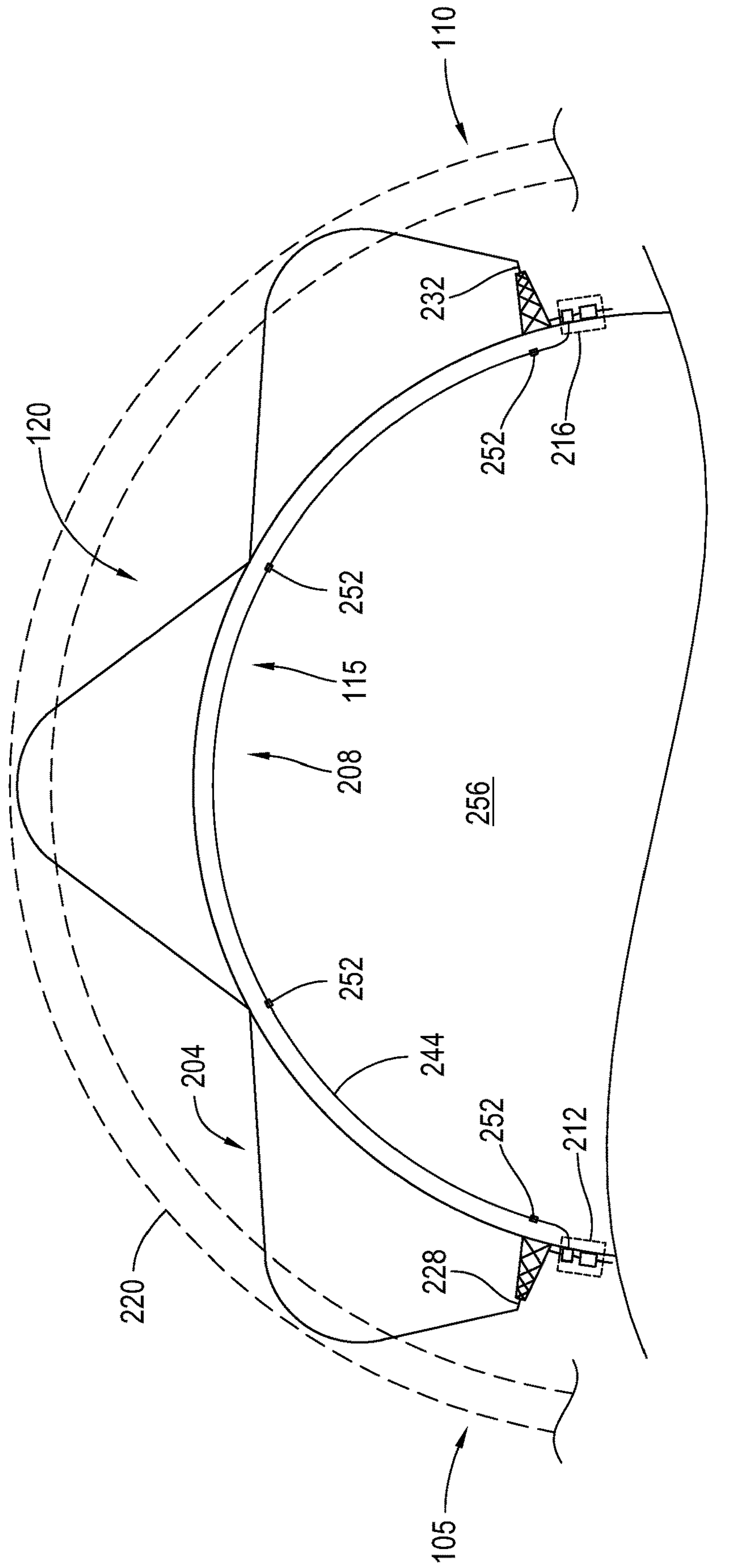
FIG. 3 is a diagrammatic view of the FIG. 2 communication system being used to communicate across an ocean.

The configuration shown in FIG. 2 is further illustrated in FIG. 3 where the first communication node 212 and the second communication node 216 are geographically remote from one another separated by a substantial portion of the surface of the earth 256. This portion of the earth's surface may include one or more continents, oceans, mountain ranges, and/or other geographic areas. For example, the distance spanned in FIG. 2 may cover a single continent, multiple continents, an ocean, and the like. In one example, the first communication node 212 is in Chicago, Illinois in the United States of America, and the second communication node 216 is in London, England, in the United Kingdom. In another example, the first communication node 212 is in New York City, New York, and the second communication node 216 is in Los Angeles, California, both cities being in North America. As shown, the transmitting antenna 228 and receiving antenna 232 are separated by a distance greater than the radio horizon such that no line of sight communications can be made. Instead, a skywave communication technique is used in which the electromagnetic waves 224 of the low latency, low bandwidth communication link 204 are skipped multiple times between the transmitting antenna 228 and receiving antenna 232. Any suitable combination of distance, communication nodes, and communications links is envisioned that can provide satisfactory latency and bandwidth.

FIG. 2 illustrates that skywave propagation allows electromagnetic energy to traverse long distances. Using skywave propagation, the low latency, low bandwidth communication link 204 transmits the electromagnetic waves 224 into a portion of the atmosphere 220 that is sufficiently ionized to refract the electromagnetic waves 224 toward the earth 256. The waves may then be reflected by the surface of the earth 256 and returned to the ionized portion of the upper atmosphere 220 where they may be refracted toward earth 256 again. Thus electromagnetic energy may "skip" repeatedly allowing the low latency, low bandwidth signals electromagnetic waves 224 to cover distances substantially greater than those which may be covered by non-skywave propagation.

Figure 4:
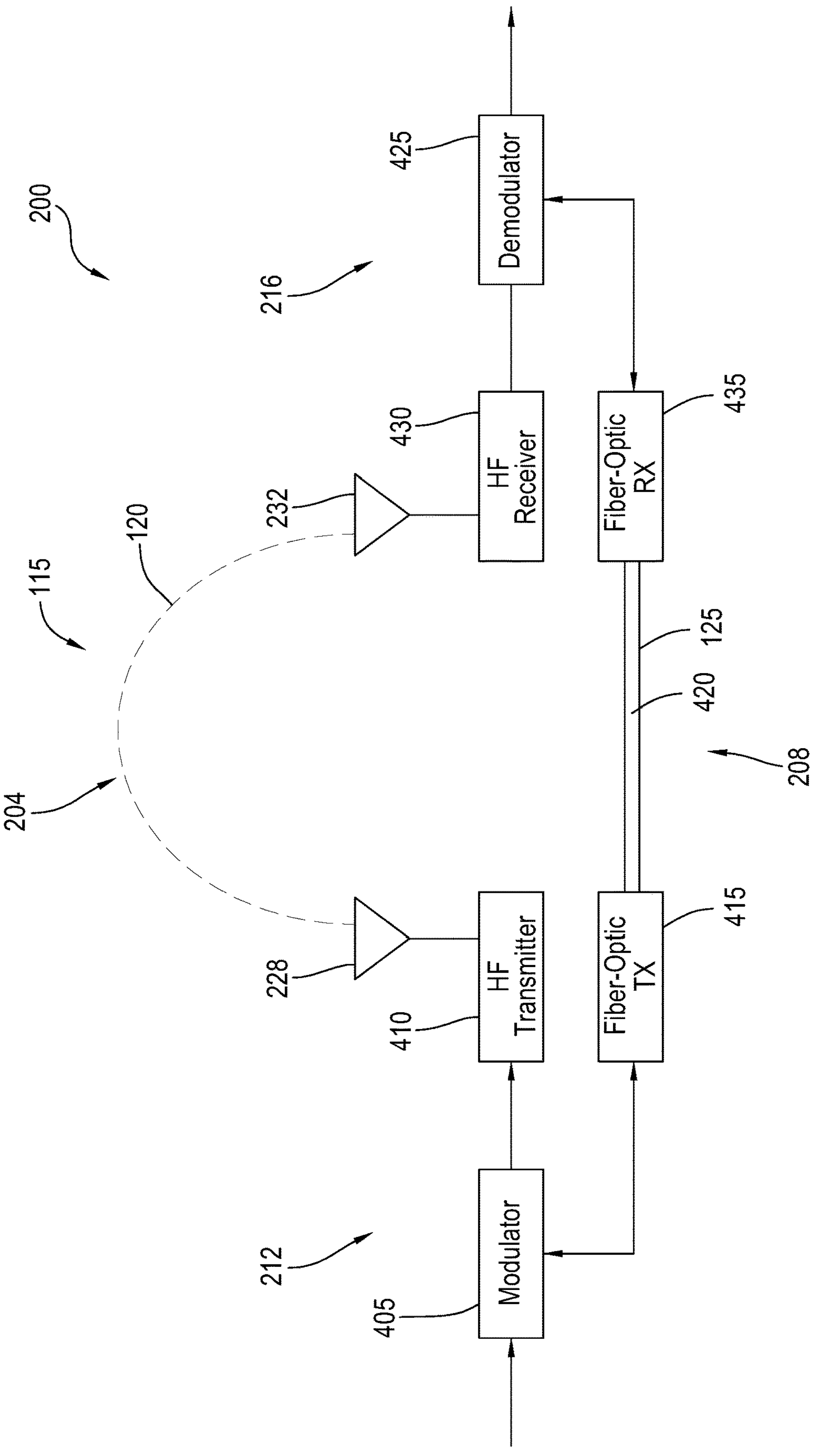
FIG. 4 is a diagrammatic view of the FIG. 2 communication system that shows further details.

FIG. 4 shows a specific implementation of the FIG. 2 communication system 200. As can be seen, the first communication node 212 in FIG. 4 includes a modulator 405, a radio transmitter 410, and a fiber optic transmitter 415. The modulator 405 includes one or more processors and memory along with other electronics, software, and/or firmware configured to modulate the message and/or other information using the above-mentioned variable messaging length technique which will be further described below. The radio transmitter 410 is operatively connected to the modulator 405 so as to transmit the message and/or other data to the second communication node 216 via the transmitting antenna 228 over one or more wireless communication channels 115. In the depicted example, the radio transmitter 410 transmits the message and/or other data via the primary communication channel 120. The fiber optic transmitter 415 is operatively connected to the modulator 405 and a fiber optic cable 420 that forms at least part of the backend communication channel 125. The fiber optic transmitter 415 is configured to transmit to the second communication node 216 one or more message tables and/or other information, such as a duplicate copy of the message transmitted by the radio transmitter 410, via the backend communication channel 125.

The second communication node 216 in FIG. 4 includes a demodulator 425, a radio receiver 430, and a fiber optic receiver 435. The demodulator 425 includes one or more processors and memory along with other electronics, software, and/or firmware configured to demodulate the message and/or other information from the first communication node 212 using the above-mentioned technique which will be further described below. The radio receiver 430 is operatively connected to the demodulator 425 so as to receive the message and/or other data from the first communication node 212 via the receiving antenna 232. In the illustrated example, the radio receiver 430 again receives the message and/or other data via the primary communication channel 120. The fiber optic receiver 435 is operatively connected to the demodulator 425 and the fiber optic cable 420. The fiber optic receiver 435 is configured to receive from the fiber optic transmitter 415 of the first communication node 212 the message tables and/or other information, such as a duplicate copy of the message from the modulator 405.

It should be recognized that the communication system 200 in FIG. 4 can facilitate one-way communication or two-way communication. For example, the modulator 405 can be configured to act as a modulator-demodulator (modem), and the demodulator 425 can likewise be a modem. The HF radio transmitter 410 in certain variations can be configured to receive wireless communications so as to act as a wireless transceiver. Similarly, the HF radio receiver 430 can also be a wireless transceiver. Both the fiber optic transmitter 415 and fiber optic receiver 435 can be fiber optic transceivers to facilitate two-way communication.

Figure 5:
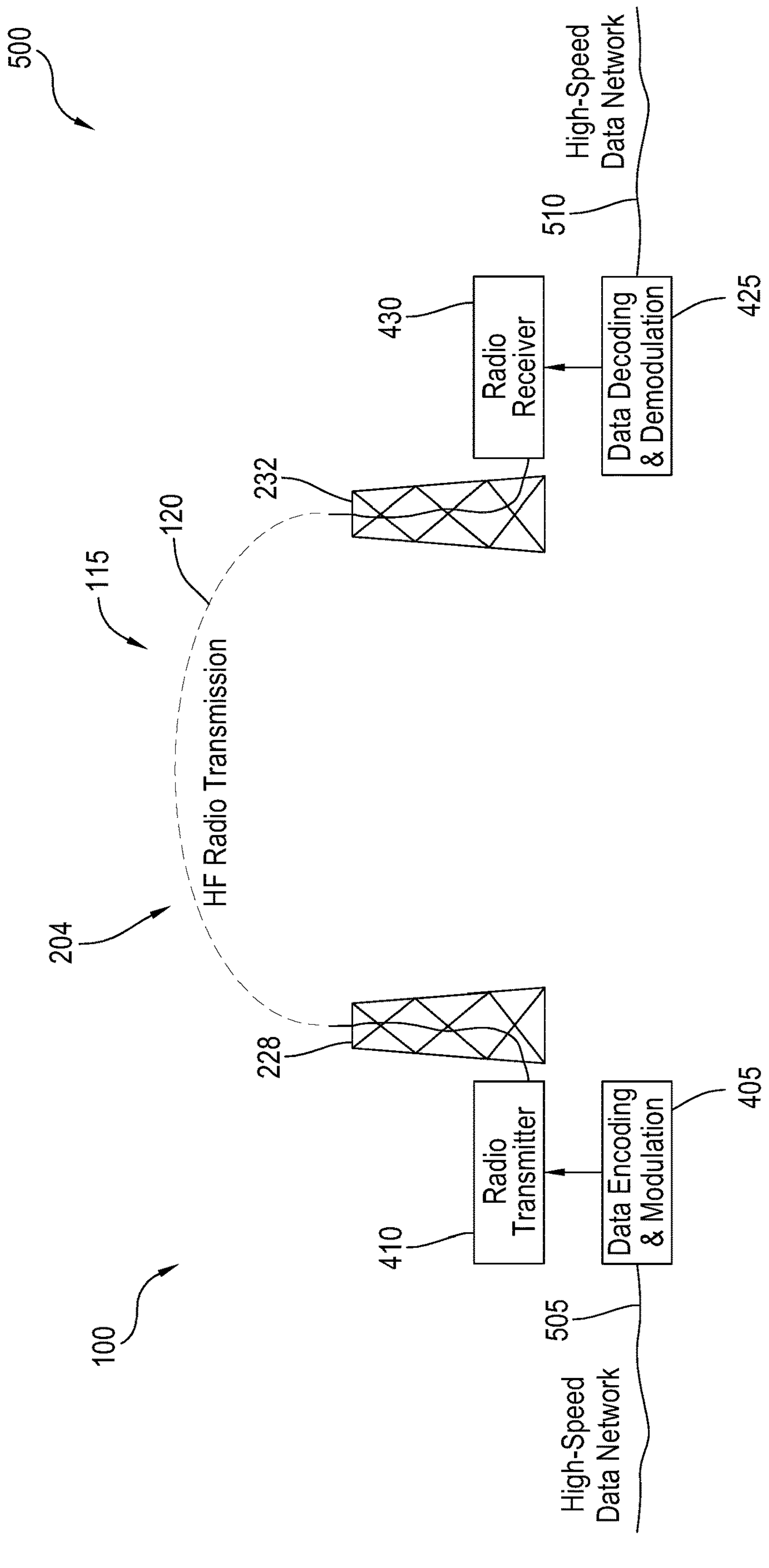
FIG. 5 is a diagrammatic view of a communication system according to a further example.

FIG. 5 shows another variation of the communication system 100 in FIG. 1 that can perform the variable length messaging technique described herein. As can be seen, a communication system 500 in FIG. 5 is constructed in a similar fashion and shares a number of components in common with the communication system 200 of FIGS. 2, 3, and 4. For instance, the communication system 500 includes the modulator 405 and the radio transmitter 410 with the transmitting antenna 228 of the type described before. Moreover, the communication system 500 includes the demodulator 425 and the radio receiver 430 with the receiving antenna 232 of the kind mentioned above. As can be seen, however, the fiber optic transmitter 415, fiber optic cable 420, and fiber optic receiver 435 have been eliminated such that all communications are wireless, and more particularly, through skywave communication. In one variation, the communication system 500 includes a single communication channel 115 in the form of the low latency, low bandwidth communication link 204 that forms the primary communication channel 120. In another variation, the radio communication between the radio transmitter 410 and radio receiver 430 is through two or more HF communication channels 115 such that one forms the primary communication channel 120 and the other forms the backend communication channel 125. In one version, the primary communication channel 120 and the backend communication channel 125 can have generally the same data bandwidth and/or latency, and in other versions, the primary communication channel 120 and backend communication channel 125 can have different data bandwidths and/or latencies. The modulator 405 in the illustrated example is connected to the client 260 through a transmitter data network 505. The demodulator 425 is connected to the instruction processor 268 through a receiver data network 510. In one form, the transmitter data network 505 and receiver data network 510 are high speed data networks.

The technique or method of using one or more variable length messages in the systems described before as well as other systems will now be generally described with reference to a flowchart 600 shown in FIG. 6. For explanation purposes, the technique will be described with reference to the communication system 200 shown in FIGS. 2, 3, and 4, but it should be recognized that this method can be used in other systems like the FIG. 1 communication system 100 and/or the FIG. 5 communication system 500. As noted before, this method is configured to increase the number of messages sent over a bandwidth limited communication channel 115 by using a variable message length encoding and decoding scheme in which the messages that have the higher probability of being sent are shorter as compared to the messages that are less likely to be sent under the current conditions. In other words, the message length increases as the expected probability of the message being sent is lower. By way of analogy, words in the English language (as well as other languages) that are commonly used, such as "a" and "the", are typically shorter than words that are used less often like "Mississippi." With this encoding scheme, the number of messages that can be sent on average over a particular communication channel 115 can be increased.

This technique can be especially helpful in high latency conditions where the communication channels 115 have limited bandwidth. Some non-limiting examples include worldwide communications across or between continents, transoceanic communications, aircraft communications, and spacecraft communications. For instance, this technique can be helpful in controlling remote spacecraft probes that have high latency and low bandwidth communication conditions where communication timing is critical. In other examples, this method can be used for communicating with submerged submarines, satellites, and remote surgical robots. To aid understanding, this technique will be described in reference to trading financial instruments, but it should be recognized that this technique can be used in other fields such as providing news and/or remotely controlling equipment.

Referring again to FIGS. 2, 3, and 4, the low latency, low bandwidth communication link 204 of the communication system 200 can be limited by the available assigned radio bandwidth and channel capacity at any given time. When using the low latency, low bandwidth communication link 204 in a financial high frequency trading application, increasing the number of messages increases the profit potential of the communication system 200. Again, this unique method has been developed to increase the number of messages sent over a bandwidth-limited wireless communication channel 115 by using variable length messages where the types of messages having the higher probability of being transmitted are shorter than those with a lower probability of being used to make a trade or perform some other transaction. With this technique, a higher number of transactions per unit of time can be communicated and/or executed. In the communication system 200, the demodulator 425 of the second communication node 216 does not need to know the message length, but the demodulator 425 deduces the length by using information from various error detection and correction techniques, such as forward error correction (FEC) and cyclic redundancy check (CRC) techniques, with one or more decoder units. For practical reasons, the messages in one particular variation are aligned to be modulated symbol boundaries as determined by the modulation method used and the overhead associated with the FEC and CRC checksum.

Figure 6:
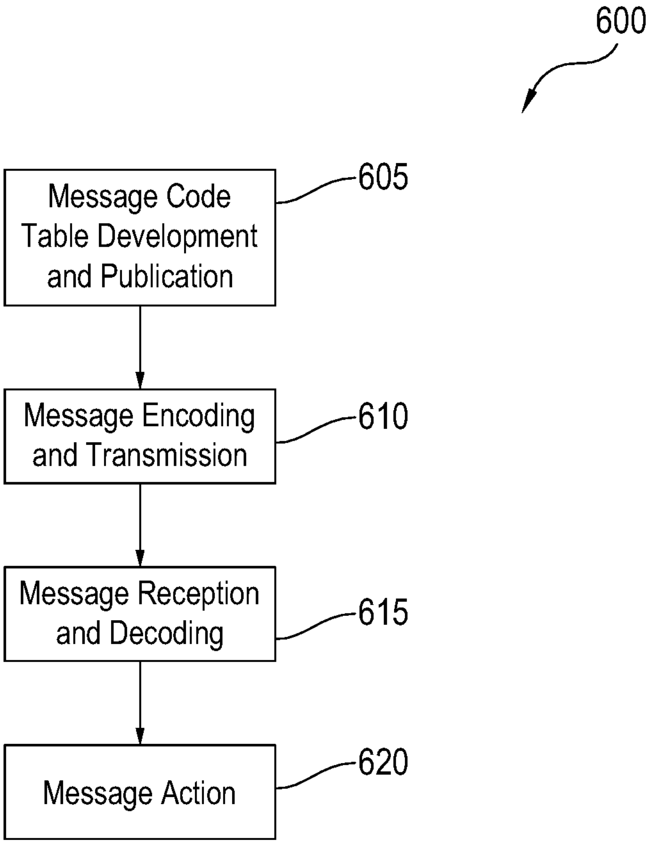
FIG. 6 is a flowchart illustrating a general method of encoding and decoding one or more variable length messages.

Looking at FIG. 6, the modulator 405 in stage 605 in one example develops a message code table (or codebook) in which the messages for the most common financial transactions for a particular trading strategy have a shorter length and the messages for financial transactions that are less common have a higher length. For example, if the trading strategy is to short sell a specific blue-chip stock, then the messages or instructions related to selling the blue-chip stock will be shorter than other messages like those for buying stocks in other companies. In practice, these trading strategies can become quite complex. Alternatively or additionally, this message frequency or probability can be augmented based on other factors. For example, the message may be shorter when the financial benefit of the transaction is significantly higher than a more common message. While a command may be more commonly used, the financial benefit of the command may be relatively small as compared to a less commonly used command that provides a significantly higher return. In one alternative example, the message length solely depends on the overall expected return for a given command either individually or in the aggregate. Those messages with higher returns are made typically smaller than those with lower financial benefits. In a further example, a combination approach is used in which a number of factors are used to determine the message length including, but not limited to, message commonality, financial rewards for the message, and/or message impact on other parties or overall strategy.

In one form, the processor, memory, and software inside the modulator 405 are used to develop this message code table, but it should be recognized that the message code table can be developed in other ways. For instance, the modulator 405 can be hardwired and/or have firmware that develops this message code table. In other examples, one or more separate computers alone or in conjunction with the modulator 405 develop the message code table. In still yet further examples, various inputs, such as news, stock information, and human inputs, are used to help develop these message code tables. While the term "table" is used to describe the message code table, the message code table can be organized in a variety of data structure forms and should not be limited to just data tables such as those found in relational databases. It is practical to use the message code table definitions to include variable levels of error control so that message security and accuracy can be adjusted according to message impact in case of false detection or error. This extra protection may be included directly into the translation table or may be implemented by adding additional FEC protection in the modem.

Once the message code table is developed, the modulator 405 then publishes the message code table by sending the message code table to the second communication node 216 and/or other reception locations. The message code table can be sent in any number of ways. For example, the message code table can be transmitted via one or more of the communication channels 115 and/or physically transported such as via an electronic storage media (e.g., DVD, flash drive, etc.). In one example, the message code table is just transmitted over the backend communication channel 125, such as the fiber optic cable 420 in FIG. 4, to preserve bandwidth on the primary communication channel 120, and in another example, the message code table is just transmitted on the primary communication channel 120 like the low latency, low bandwidth communication link 204 in FIGS. 4 and 5. In still yet further variations, a combination approach is used in which all or part of the message code table is transmitted in both the primary communication channel 120 and backend communication channel 125 so as to add redundancy and reduce errors. For instance, the radio transmitter 410 via the transmitting antenna 228 in FIG. 4 transmits all or part of the message code table over the low latency, low bandwidth communication link 204 to the receiving antenna 232 of the radio receiver 430 at the demodulator 425, and the fiber optic transmitter 415 at the first communication node 212 transmits all or part of the message code table via the fiber optic cable 420 of the high latency, high bandwidth communication link 208 to the fiber optic receiver 435 of the second communication node 216. Once the message code table arrives at the second communication node 216, the processor of the demodulator 425 stores the message code table locally in memory inside the demodulator 425 and/or remotely such as in a remote server (e.g., for backup or other purposes). To offload work and free up operational bandwidth at the second communication node 216, the message code table can be received and, if needed, preprocessed at a receiver located relatively close to the second communication node 216. From this closer receiver station, the message code table can be sent to the demodulator 425 of the second communication node 216 via a high speed network like via microwave transmission.

The modulator 405 of the first communication node 212 can develop and/or publish these message code tables one time, periodically, or on an as-needed basis. A combination of approaches can be used. For instance, the modulator 405 can develop and publish on a periodic basis, say once an hour or every business day, but the modulator 405 can develop and send a full or partially updated message table when certain market conditions occur that warrant changing the trading strategy which in turn changes message probabilities or prevalence. The first communication node 212 then can send partial or full updates of the message table to the second communication node 216 and/or other nodes.

Referring again to the flowchart 600 in FIG. 6, when a particular command, such as for a particular trade or trading strategy, needs to be issued, the modulator 405 encodes the command or message using the cipher of the message coding table in stage 610. For instance, a specific market condition and/or a piece of news may necessitate the sale of one or more stocks. A stockbroker or, more likely, a computer for the stockbroker issues the stock trade command and/or retransmission of the particular news piece to the first communication node 212. Based on the current message code table, the modulator 405 encodes all or part of the message or command. The message can be encoded using any number of FEC techniques, and the encoded message normally includes some type of checksum. In one version, the message is encoded using a combination of a Tail-Biting Viterbi FEC and a CRC checksum. Other FEC codes and checksums may be used in other variations. The radio transmitter 410 via the transmitting antenna 228 transmits all or part of the encoded message over the low latency, low bandwidth communication link 204 via skywave propagation in stage 610. The first communication node 212 via the fiber optic transmitter 415 may also transmit all or part of the encoded message over the fiber optic cable 420 of the high latency, high bandwidth communication link 208. With the communication system 500 in FIG. 5, the encoded message is only sent over the low latency, low bandwidth communication link 204 via a HF radio transmission using a skywave communication technique.

In stage 615, the radio receiver 430 via the receiving antenna 232 receives the encoded message from the first communication node 212, and the radio receiver 430 of the second communication node 216 sends the encoded message to the demodulator 425. Typically, but not always, the radio receiver 430 sends individual symbols of the encoded message to the demodulator 425 as the symbols are received so as to speed up the decoding process. In some cases, the radio receiver 430 can buffer the symbols when the symbol count for a new message is below the smallest message size for a given message code table. However, in most cases, the received signal is directly sent from the radio receiver 430 to the demodulator 425 for processing.

As will be explained in greater detail below, the demodulator 425 uses the previously received message table in stage 615 to decode the message. The demodulator 425 does not know the length of the transmitted message. In other words, the demodulator 425 does not know when the message will end, because the demodulator 425 does not know the size of the message frame for the message. As each symbol is received, the demodulator 425 converts the signal to digital data and buffers the symbol with other symbols in memory that were received after the last determined message to form a pseudo-message that is tested. The message frame of the shortest supported rate from the message code table is used by the demodulator 425 to determine if this collection of received symbols or pseudo-message is a valid message. For example, the demodulator 425 performs a checksum or other error detecting technique to determine if the collection of symbols forms a valid message. Symbols continue to be added to the buffer and the checksum test is performed again on this larger frame of symbols. The demodulator 425 can perform this checking in a serial fashion and/or through a parallel processing technique. The demodulator 425 for example can include more than one physical and/or software-based demodulator to facilitate parallel processing. Each of the physical or virtual demodulators 425 can be assigned a specific message length to determine message validity by performing the checksum and/or other error detection functions at the same time.

Once the demodulator 425 detects a valid message in stage 615, such as by calculating a valid checksum, the demodulator 425 sends the decoded message or command to perform an action or not in stage 620. For example, the message can be sent to the instruction processor 268 in FIG. 2. In stage 620, a trade of a specific stock for instance can be automatically executed by computers upon receipt of this command message. It should be also recognized that no actual action may occur in stage 620. For example, the message may provide news or other information that is later used as part of the overall trading strategy, or the message may indicate to hold onto a particular financial instrument and to not sell the instrument.

One technique for developing and publishing the message code table of stage 605 will now be described with reference to a flowchart 700 in FIG. 7. The actions of this technique will be described as being performed via the processor, memory, and software of the modulator 405 in FIGS. 4 and 5, but it should be recognized that this technique can all or in part be performed by other equipment and/or other entities. For instance, some or all of these acts can be performed by a client stockbroker computer that transmits all or part of the message code table to the modulator 405 and/or demodulator 425. In another example, the demodulator 425 creates and publishes the table. Again, while this technique will be described with reference to financial transactions, it should be recognized that this technique can be used in other fields.

Figure 7:
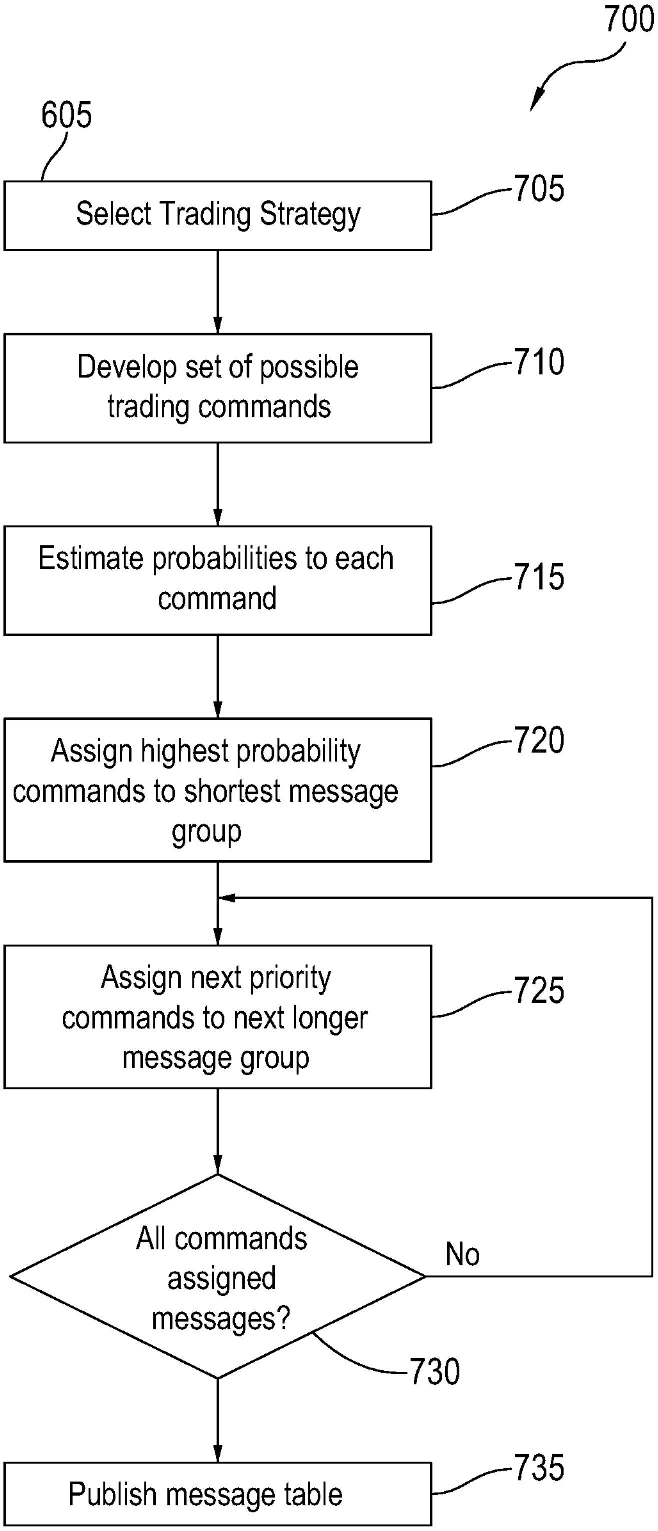
FIG. 7 is a flowchart illustrating a method for developing a message code table.

As shown in FIG. 7, the client, such as a stock trader, in stage 705 manually and/or automatically selects a specific trading strategy depending a wide variety factors, including market conditions, economic conditions, and the news, to name just a few. Based on the selected trading strategy, the client, a computer system for the client, and/or the modulator 405 develops a list of possible trading commands in stage 710. These commands can include, but are not limited to, buying, selling, trading, and/or keeping financial instruments at different price levels. This set of potential trading commands can in part be based on past trading strategies.

The variable length message code table is based on the trading strategy to be implemented. Some strategies may have a smaller possible message set than others. Each message is given a message use probability based on past frequency of execution of identical or similar trading strategies. Commands or messages with a higher probability of being sent are given shorter message lengths than lower probability messages. In light of historical and/or other data, the client, the computer system for the client, and/or the modulator 405 in stage 715 assigns command probabilities or frequency categories to each command based on the likelihood the specific command will be issued under the designated trading strategy. Once more, these estimated probabilities can be augmented or replaced by other factors. For instance, the probability that a message will be sent can be factored by the financial benefit of the command such that the command is graded or ranked based on the overall expected net value or financial benefit under the designated trading strategy.

In the following manner, a message code table is then built with each message describing a specific type of action or command. In stage 720, the client, a computer system for the client, and/or the modulator 405 assigns the most frequently sent and/or highest financially ranked message to the shortest message group (i.e., message size with the lowest length). Within each message size group, a unique message code is assigned to each command or action.

To provide a very simplified example, the shortest message group may be two-bits long such that four (4) commands can be assigned to the two-bit message group. In this example, the four most common commands for the designated trading strategy is "buy one share of company X", "sell two shares of company Y", "hold the shares of company Y", and "buy three shares of company Z". For this shortest, two-bit message group, the "buy one share of company X" command is assigned a message signifier of zero (i.e., 00 in binary), the "sell two shares of company Y" is designated by a message with the number one (i.e., Olin binary) as its contents, the "hold the shares of company Y" is designated by the number two (i.e., 10 in binary), and the "buy three shares of company Z" is designated by the number three (i.e., 11 in binary). The order of these commands within the particular message group length can be in no particular order, ordered based on probability, or based on some other scheme. When for instance the demodulator 425 (FIGS. 4 and 5) decodes a message to have the value of "3" (i.e., 11 in binary), a trade will be executed in which three shares of company Z are bought.

In one particular embodiment, message lengths are integer number of bytes with the last bit of the byte ending in a fixed value, such as zero (0), and with another value, such as one (1), indicating an extension of the message following the current message. Other message extension approaches can be used in other examples. For instance, messages can be built in blocks of multiple bytes using an extension indicator. In another embodiment, a message header bit indicates the message length by having the number of leading zeros (0's) or ones (1's) indicating the expected message length. The message code table definitions can also include variable levels of error control so that message security and accuracy can be adjusted according to message impact in case of false detection or error. This extra protection may be included directly into the translation table and/or may be implemented by adding additional FEC protection in the modem.

Once all of the spaces for the commands at the shortest message length are filled, the next remaining groups of commands with the next lowest probability and/or rank are assigned in stage 725 to the next available shortest group that has a message length longer than the first or highest probability message group. Returning to the previous simplified two-bit message group length example, once all four numbers are associated with commands in the two-bit message group length, the next highest probability level or ranked commands are then assigned to a longer, three-bit message group length. The modulator 405 (or client system) checks to see if all of the commands have been assigned in stage 730 and keeps on assigning messages to progressively longer message groups based on probability and/or rank in stage 725.

Once all of the commands have been assigned in stage 730, the modulator 405 publishes the resulting message code table in stage 735 in the same manner as described before by transmitting the message code table to the demodulator 425 of the second communication node 216. Again, the modulator 405 can transmit the message code table via one or more of the communication channels 115 such as via the primary communication channel 120 and/or backend communication channel 125. In one example, the modulator 405 transmits the message code table via the fiber optic cable 420 that forms the high latency, high bandwidth communication link 208. The message code table in one variation is published to both the radio transmission and reception equipment. In one embodiment, the fiber optic cable 420 is used, but any available communication channel 115 may be used. It should be noted that the fiber optic channel is likely to have more propagation delay than the main wireless channel used to send the trading commands. Once the message code table is set at both modulator 405 and demodulator 425, the trading strategy is then executed using the variable length message code table. When it is time to change strategies or conditions change, a new command to message mapping may be constructed and published in the same fashion as described above (e.g., starting again at stage 705).

In another example, the demodulator 425 or a computer at the second communication node 216 performs the acts of creating and publishing the message code table in accordance with the flowchart 700 in FIG. 7. In this example, the demodulator 425 can maintain in memory information concerning the message frequency probabilities and other data (e.g., financial conditions, weather conditions, noise conditions, etc.) from multiple different transmitters and/or other sources. With this example, the demodulator 425 is able to create the message code table based on a larger data set which presumably would increase the quality of the message code table. Once the message code table is completed, the demodulator 425 in stage 735 transmits the message code table to the modulator 405 of the first communication node 212 such as through the low latency, low bandwidth communication link 204 and/or high latency, high bandwidth communication link 208.

There are a large number of techniques that can be used to set the message lengths for the message groups in the message code tables. FIG. 8 shows a first example of a message group table structure 800. In the FIG. 8 message group table structure 800, the message groups grow or expand in a linear fashion. Specifically, the message group table structure 800 shows a linear expansion where each message size grows by M-bits. In this case, the most common messages will be represented by a code word of length M. FIG. 9 shows an example message group table structure 900 of the FIG. 8 message group table structure 800 in which the message length is incremented by 8 bits. As shown in FIG. 9, if M is 8 bits, there are 256 messages available from the first message probability group (i.e., Group 1). Thus, 256 commands or messages having the greatest expected use frequency (or other rank) can be sent with a message length of 8 bits. Messages having lower use probability can be assigned to the second message probability group (i.e., Group 2) or subsequent groups. In the second message group, 65,536 messages of 16-bit length can be sent. Generally, two messages from the first probability message group, which have the highest expectation of being sent, can be sent in the same time as a single message from the second message probability group. It therefore should be recognized that on average more messages for a given time period can be transmitted using this variable length message communication technique as compared to fixed message length communication techniques. FIG. 10 shows another example of a message group table structure 1000 in which a geometric progression is used for increasing message sizes for the message probability groups.

In one form, the above-discussed message size coding techniques assume each variable length OTA message has its own CRC and FEC protection. In other variations, this method is extended to include multiple variable-length messages in CRC/FEC protected OTA packets. For this variation, each message includes an indication of the message length. For instance, a message assigned to the first message probability group has a single leading zero (0) for group 1, a message assigned to the second group has two leading zeros (00), and so on.

During transmission of the messages, the message length can vary from one message to the next depending on which message is sent and to which message probability group it belongs. Returning to the FIG. 9 example, a first message belonging to message probability group 4 would have a length of 32-bits, and the next or second message belonging to message probability group 1 would be 8 bits long. Subsequent messages could have the same or different message lengths depending on the message. At the radio receiver 430, the demodulator 425 does not know ahead of time the length of the message the radio receiver 430 is receiving. Since the message length is not known ahead of time, a unique technique or method has been developed that allows the demodulator 425 to detect message validity and length concurrently. In one version, this technique uses a combination of a Tail-Biting Viterbi FEC and a CRC checksum. Other FEC codes and checksums may be used in other variations. Radio and other transmissions tend to be noisy, and as such, there is a significant risk of errors in the received message. False positives or false negatives can occur during the transmission and decoding process. Both of these errors can be problematic, especially when dealing with financial instrument transactions. For example, false positives occur when a message is considered valid when in fact the message is not valid (i.e., not a message at all). As should be recognized, this false positive message can cause a financial transaction to occur when the transaction was not desired. This decoding approach is designed to prevent false positives (i.e., messages declared valid are not actually due to noise or bit errors).

One technique for receiving and decoding the transmitted variable length messages of stage 615 in FIG. 6 will now be described with reference to a flowchart 1100 shown in FIG. 11. The technique will be described with reference to the communication system 200 in FIG. 4 and the communication system 500 in FIG. 5, but it should be recognized that other communication systems 100 can utilize this method. The demodulator 425 and radio receiver 430 have one or more processors, memory, software, and other electronics that are configured to perform this method. While this method will be described as being performed by the demodulator 425 and radio receiver 430, it should be appreciated that all or parts of these acts can be performed by other systems.

Figure 11:
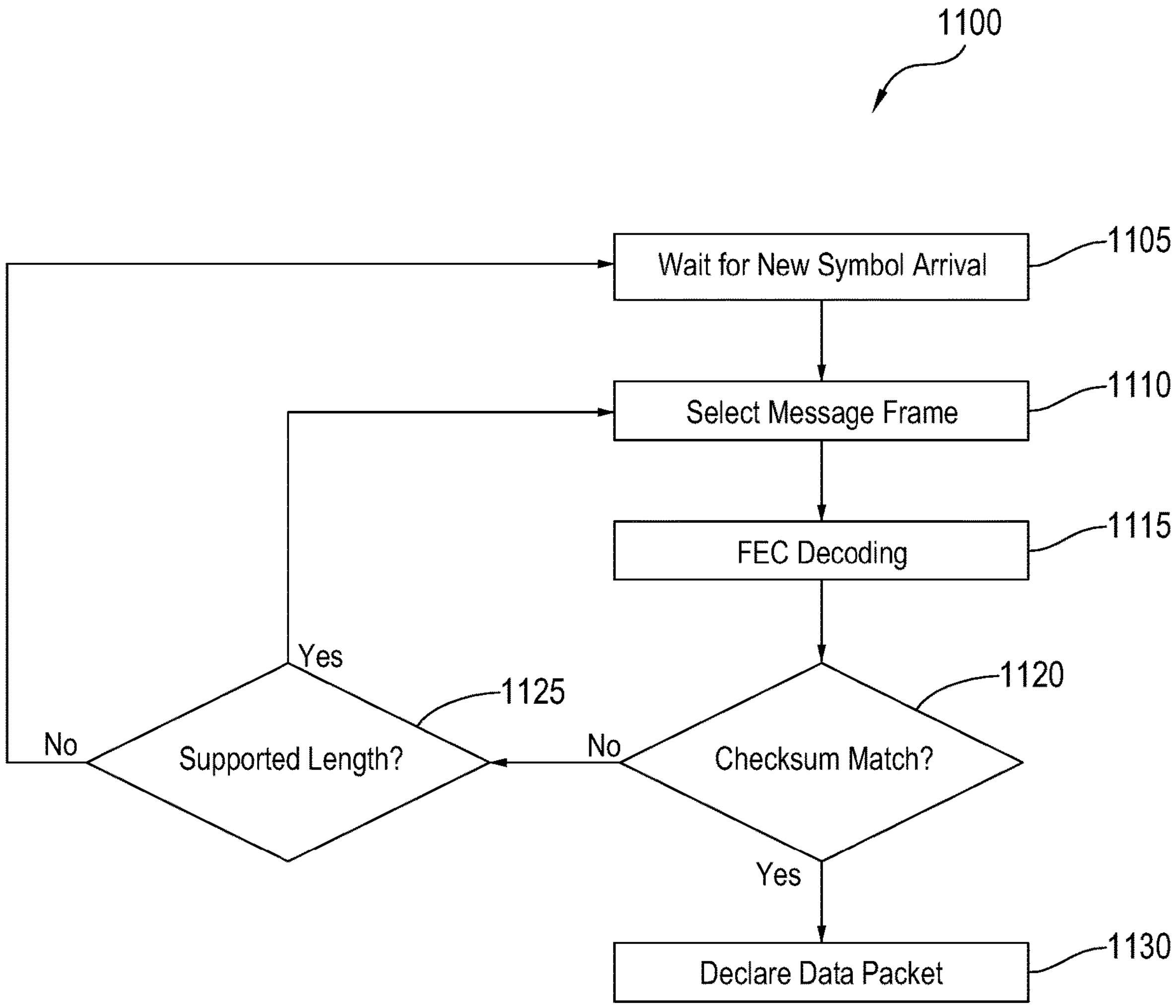
FIG. 11 is a flowchart illustrating a method of decoding one or more messages with variable lengths according to one example.

Looking at FIGS. 4, 5, and 11, the demodulator 425 in stage 1105 waits for a new symbol to arrive at the radio receiver 430. When a new symbol from the low latency, low bandwidth communication link 204 is detected by the radio receiver 430, the symbol is buffered in the memory of the demodulator 425 along with the previously received symbols. The newly received symbol will normally add one or more bits to the received queue. This series of the symbols received by the radio receiver 430 and stored in memory can include all or part of the message. However, these symbols can also include fill data (i.e., blank spaces between messages) and/or noise. The demodulator 425 analyzes all of these symbols regardless of their content (e.g., fill data, noise, etc.) to determine whether a message has been received. In other words, the demodulator 425 must consider every symbol, whether actually containing message data, fill data, or noise as a potential packet start. Due to the variable length of the messages, however, the demodulator 425 does not know the length of the message.

In stage 1110, the demodulator 425 initially selects the frame or message length from the message probability group having the shortest length. Normally, but not always, the demodulator 425 starts with the shortest length supported by the message code table. Using the message group table structure 900 in FIG. 9 as an example, the demodulator 425 picks the 8 bit message length, which is the shortest, from the first message probability group (i.e., Group 1). With message frame or length selected, the demodulator 425 in stage 1115 decodes via FEC the pseudo-message formed by the buffer of symbols in memory using the current message length as a basis. Returning to the previous example, the demodulator 425 performs FEC decoding using an 8-bit frame length. In one embodiment, this algorithm is a Tail-Biting Viterbi Algorithm. However, other FEC decoding algorithms can be used. For example, FEC decoding can be a different tail-biting convolutional decoding algorithm or a block code such as Reed Solomon.

In stage 1120, the demodulator 425 calculates a cyclic redundancy check (CRC) and/or other checksum for the FEC decoded data, and the resulting checksum information for the message is checked by the demodulator 425 in stage 1120 to see if it matches the expected checksum. For explanation purposes, the technique will be described as using a CRC, but it should be recognized other types of checksums can be used. Typically, but not always, the expected CRC or checksum value is packaged or contained within the transmitted message, and the FEC decoded data includes the expected checksum value. In other variations, the expected checksum value can be transmitted or otherwise provided separately. For example, the message code table provided to the demodulator 425 can already include the expected checksum value for each message. The demodulator 425 performs a CRC on the FEC decoded data on order to calculate the checksum. If the checksum does not match the expected checksum in stage 1120, the demodulator 425 in stage 1125 determines whether the next largest message size is supported by the message code table. Normally, the demodulator 425 increments to the larger length of the next message probability group. So, returning to the previous FIG. 9 example, the demodulator 425 would increment up from the 8-bit length of Group 1 to the 16-bit length of Group 2 which is supported by the message group table structure 900.

When the next length is supported in stage 1125, the demodulator 425 cycles back to stage 1110 and selects this next larger message length which in this example is 16-bits. The demodulator 425 in stage 1115 performs FEC decoding using this now larger 16-bit frame. This larger frame includes the most recent symbol as well as the ones immediately before so as to add up to the 16-bit length. In other words, the demodulator 425 works back in time by tacking together the recent symbol with the more recently received ones to add up to the current frame size (i.e., 16 bits in this case) for decoding purposes. After decoding the next length in stage 1115, the demodulator 425 in stage 1120 determines if the checksum is valid. If the checksum is not valid, the demodulator 425 in stage 1125 determines if the next message length is valid according to the scheme used for the message code table. If the next, larger length is valid, the demodulator 425 cycles again to stage 1110 to perform the same decoding and checks for the larger sized message in stage 1110, stage 1115, and stage 1120.

On the other hand, when the message length is not supported, the demodulator 425 cycles back to stage 1105 so as to wait for the next symbol to be received. Looking at the message group table structure 900 in the FIG. 9 example, a next message size larger than 40 bits (i.e., after Group 5) is considered not supported in stage 1125. In other words, the demodulator 425 knows the modulator 405 would not encode a message size larger than specified by the shared message code table. When this occurs in stage 1125, the demodulator 425 starts again in stage 1105 and waits for the next symbol arrival. In stage 1110, the demodulator 425 starts again with the smallest message (e.g., 8 bits in FIG. 9), and the process cycle continues.

Once the CRC or other checksum from the FEC decoding stage 1115 matches in stage 1120, the demodulator 425 declares the message valid and prepares a data packet to transmit the message or command in stage 1130 to the instruction processor 268. For instance, if a checksum match is found, then a data packet is declared and sent out the receiver user data port. The sent message for instance can be packaged for transmission over high speed data networks. Again, this message can be used to execute (or not) a financial transaction.

Figure 12:
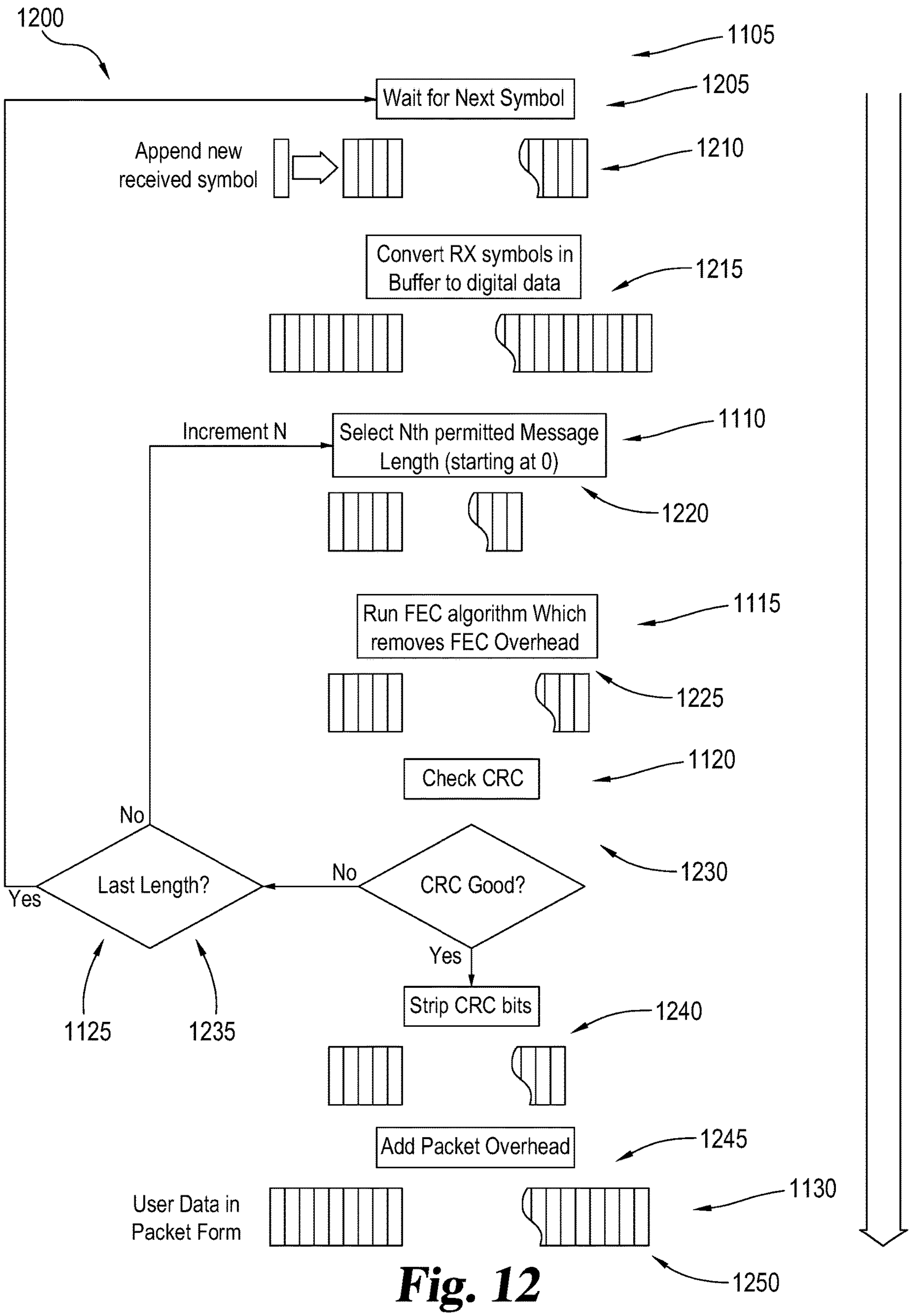
FIG. 12 is a diagram illustrating another method of decoding messages with variable lengths.

FIG. 12 shows a diagram 1200 that provides more details for the technique illustrated by the flowchart 1100 in FIG. 11. The demodulator 425 in stage 1205 waits for the next symbol in the same fashion as stage 1105 in FIG. 11. In stage 1210, the newly received symbol is appended to the older symbols stored in the memory of the demodulator 425. The demodulator 425 in stage 1215 converts these received symbols in the memory buffer to digital data so as to facilitate later decoding. Like in stage 1110 in FIG. 11, the demodulator 425 in stage 1110 initially selects the smallest message length in stage 1220 and progressively works to decoding and checking larger message sizes. In this example, the initial message length starts from a zero-bit length or position. As in stage 1115, the demodulator 425 in stage 1225 runs an FEC algorithm to decode the message and remove any FEC overhead such as extraneous parity check bits. Like stage 1120 before in FIG. 11, the demodulator 425 in stage 1230 in the diagram 1200 of FIG. 12 performs a CRC check to see if the message is valid. If not, the demodulator 425 checks to see if the next message length is supported in stage 1235 (1125 in FIG. 11). When supported, the demodulator 425 cycles back to stage 1220 and performs FEC decoding and CRC checking in stage 1225 and stage 1230 for the now larger message length. The demodulator 425 continues to cycle through larger message lengths until the last message length for the message code table is exceeded in stage 1235 or the CRC check is satisfied. When the message size limit is reached, the demodulator 425 proceeds to wait for the next symbol, and the cycle continues again. On the other hand, when a valid message is detected in stage 1230, the demodulator 425 strips any CRC bits from the message in stage 1240. The now stripped message is repackaged with packet overhead and user data is added to the packet in stage 1245 and stage 1250, respectively. The new message can then be used to execute an action (620 in FIG. 6) such as a financial transaction.

In the previous examples, the demodulator 425 performed the algorithm in a serial fashion by incrementing from the shortest to longest acceptable message lengths. In another variation, a parallel approach can be used. Considering that the HF radio symbol time is slow compared to the clock time of modern signal processing and computer technology, a time-sliced approach can be used to reduce the time for decoding and forwarding a received message.

Figure 13:
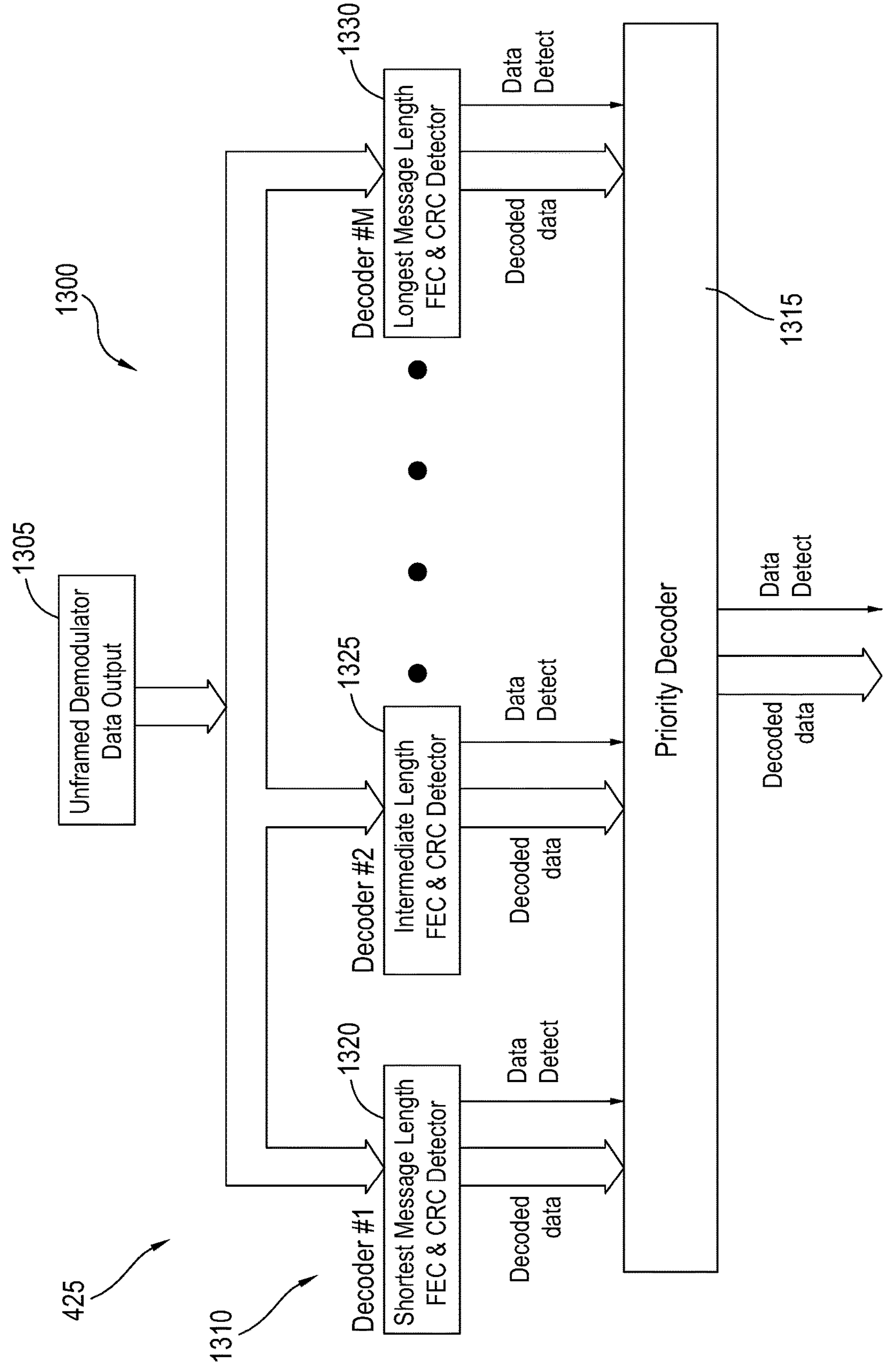
FIG. 13 is a diagrammatic view of a decoder system according to another example.

One example of a distance 130 that can be used in the demodulator 425 for performing this parallel or time-sliced approach is depicted in FIG. 13. It should be recognized that the components of the decoder system 1300 can be configured through hardware, software, and/or a combined approach. For example, these components can be virtual in that the components exist as separate processes or algorithms in a computer or the demodulator 425. In another example, the components can be in the form of dedicated hardware such as electronics specifically designed to perform at least a part of the decoding process. In one variation, the decoder system 1300 is amenable to a field-programmable gate array (FPGA) and/or software implementation.

As shown, the decoder system 1300 includes an unframed demodulator data output 1305, a plurality of decoders 1310, and a priority decoder 1315. The unframed demodulator data output 1305 provides the unframed demodulator data to the decoders 1310. Once more, this unframed data may or may not contain a message with an unknown length. The unframed data contains a series of the symbols received by the radio receiver 430 and stored in memory. These symbols can include all or part of the message. However, these symbols can also include fill data (i.e., blank spaces between messages) and/or noise. The decoder system 1300 analyzes all of these symbols regardless of their content (e.g., fill data, noise, etc.) to determine whether a message has been received. In other words, the decoder system 1300 must consider every symbol, whether actually containing message data, fill data, or noise, as a potential packet start. Due to the variable length of the messages, however, the decoder system 1300 does not know the length of the message.

The decoders 1310 receive the unframed message data from the unframed demodulator data output 1305. Each of the decoders 1310 is dedicated to a specific message length associated with a message probability group. In other words, the system has a series of decoders 1310 each dedicated to decode a specific message length. In the illustrated example, the decoder system 1300 has a set of M decoders 1310. For instance, the depicted decoders 1310 include a shortest length decoder 1320, an intermediate length decoder 1325, and a longest length decoder 1330 along with other decoders 1310. The shortest length decoder 1320 is configured to decode and detect if a message having the shortest message length (e.g., from group 1) has been received. The longest length decoder 1330 is configured to decode and detect if a message having the longest message length according to the message code table has been received. The intermediate length decoder 1325 is designed to decode and detect a message with a length between the longest and shortest lengths. Using FIG. 9 as an example, the shortest length decoder 1320 would analyze using 8 bit message lengths (group 1), the intermediate length decoder 1325 would analyze using 16 bit message lengths (group 2), and the longest length decoder 1330 would analyze using 40 bit message lengths (group 5). In one form, the decoders 1310 decode and detect messages in a similar fashion as described before by using FEC decoding of the message and checking for a valid CRC or checksum. In certain embodiments, this is done by using a combination of a Tail-Biting Viterbi FEC and a CRC checksum. Other FEC codes and checksums can be used in other examples.

With each decoder 1310 being dedicated to a specific message, the different message lengths can be analyzed in parallel if needed so as to speed up the overall decoding and message detection process. These parallel decoders 1310 may run concurrently or may be run in sequence if the processing at the receiver is sufficient to execute all functions in OTA symbol time.

Once one of the decoders 1310 detects a valid message (e.g., the message has a valid checksum), the decoder 1310 sends a data or message detect signal to the priority decoder 1315 along with the decoded data or message. The data detect signal can be in the form of a binary signal (i.e., yes or no) indicating that the message was detected or a non-binary/analog form providing additional information. For instance, when in a non-binary form, the data detect signal can indicate a confidence level that the message is valid. The priority decoder 1315 is configured to accept the data from the first decoder 1310 to declare data found overriding the others. The priority decoder 1315 is further configured to inform the decoders 1310 that a valid message has been detected so that the decoders 1310 are then able to search for the next valid message. For example, when the intermediate length decoder 1325 detects a valid message, the intermediate length decoder 1325 sends a data detect signal to the priority decoder 1315 along with the decoded message or data. The priority decoder 1315 then alerts all or some of the decoders 1310 about the detection, and in response, the decoders 1310 decode the next data from the unframed demodulator data output 1305. In case of ties between the decoders 1310, the priority decoder 1315 can use any number of tie breaking rules such as the smaller message length message wins.

The decoded message and data detect signal are then sent to the client or other destination in a similar fashion as described before. Through the data detect signal signifying decoding confidence, the client may find the information useful in deciding whether a particular action is warranted. For example, the data detect signal may only marginally indicate that the message is valid. In such a case, the client may take an approach of disregarding such marginal messages.

Figure 14:
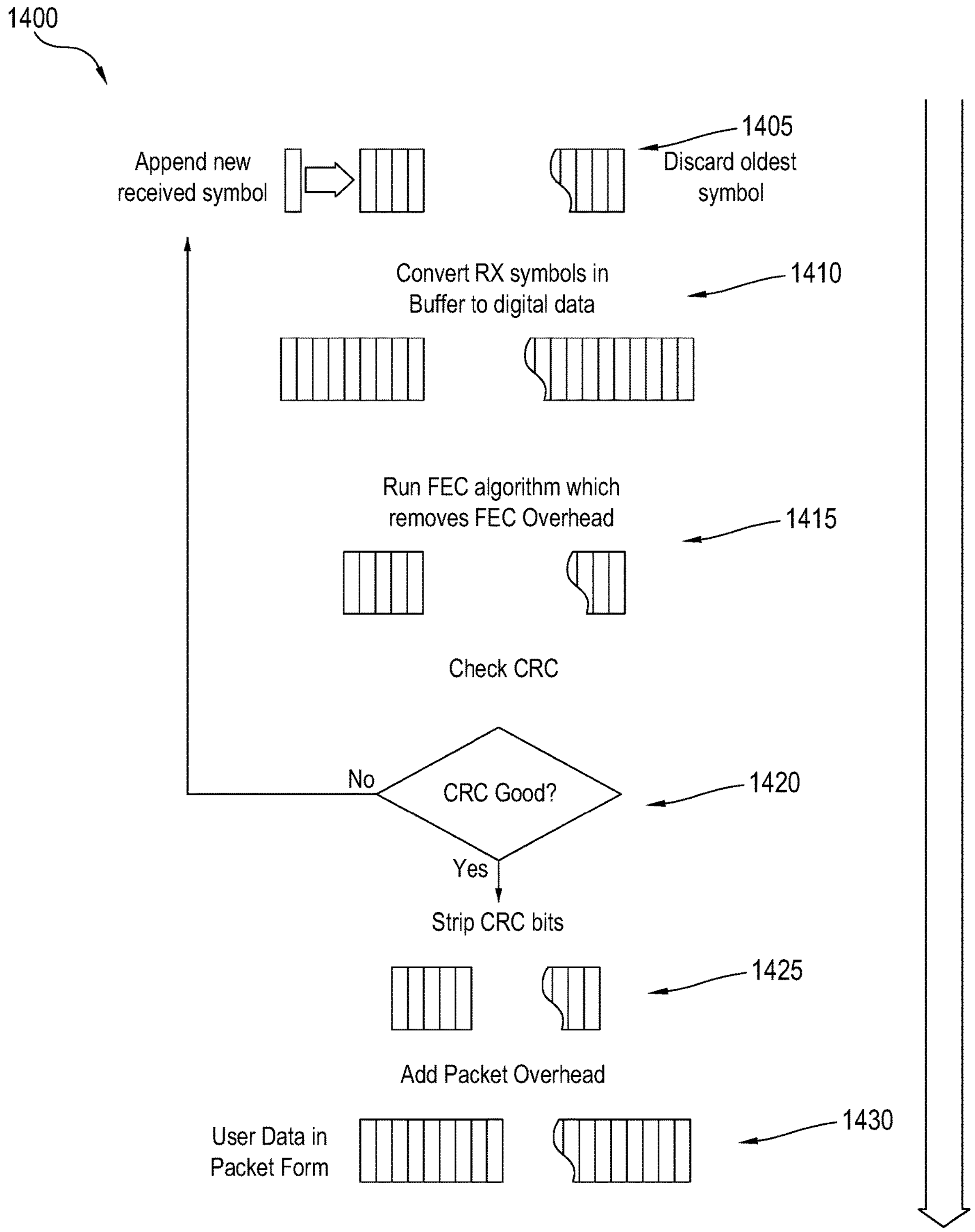
FIG. 14 is a diagram illustrating a technique in which the decoders in the FIG. 13 decoder system use to decode messages with variable lengths.

FIG. 14 shows a diagram 1400 that depicts a process each of the decoders 1310 in FIG. 13 perform to decode and detect valid messages. It should be appreciated that the process is similar to the process illustrated by the diagram 1200 in FIG. 12, but the process has been stripped down by eliminating the cycling through each message length because each of the decoders 1310 is dedicated to a specific message length.

The decoder 1310 in stage 1405 waits for the next symbol in the same fashion as described before. In stage 1405, the newly received symbol is appended to the older symbols stored in the memory of the decoder 1310. The decoder 1310 in stage 1410 converts these received symbols in the memory buffer to digital data so as to facilitate later decoding. The decoder 1310 in stage 1415 runs an FEC algorithm to decode the message and remove any FEC overhead such as extraneous parity check bits. In this case, the FEC is done based on the specified message length for the decoder 1310. The decoder 1310 in stage 1420 performs a CRC check to see if the message is valid. In one form, a combination Tail-Biting Viterbi FEC and a CRC checksum is used. Other FEC codes and checksums may be used. If the CRC is not valid in stage 1420, the decoder 1310 proceeds to wait for the next symbol in stage 1405, and the cycle continues again. On the other hand, when a valid message is detected in stage 1420, the decoder 1310 strips any CRC bits from the message in stage 1425. The now stripped message is repackaged with packet overhead and user data is added to the packet in stage 1430. The decoder 1310 sends a data detect signal and the decoded message to the priority decoder 1315. This new message can then be used to execute an action (620 in FIG. 6) such as a financial transaction.

It should be appreciated that the system and methods described herein address several issues. For instance, by using a table of variable length messages where the shortest messages are the most probable or common, a larger number of messages can be communicated over a limited bandwidth channel over a period of time as compared to a set of constant length messages that need to cover all possibilities. Support for variable length messages at the baseband level allows mixing of message lengths as will occur when the modems change operating modes which may be done independently of the baseband processing portion of the system. It is practical to use the message code table definitions to include variable levels of error control so that message security and accuracy can be adjusted according to message impact in case of false detection or error. This extra protection may be included directly into the translation table or may be implemented by adding additional FEC protection in the modem. Compression of some messages into shorter messages also provides the possibility of increasing the error overhead, and thus, it provides more error protection for such messages.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization. In the case of radio waves, an antenna may transmit at frequencies ranging along an electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data. Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical, horizontal, or any combination thereof. Antennas may also be configured to radiate electromagnetic energy within a specific range of vertical angles (i.e. "takeoff angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies. Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Backend Communication Channel", "Secondary Communication Channel", or "Secondary Channel" generally refers to a communication pathway that is a main choice for transferring information. Typically, but not always, the secondary channel has one or more properties, such as latency or bandwidth, that make the channel less desirable over a primary channel. For example, a secondary channel can have a lower data rate and/or latency as compared to a primary channel. A primary channel may support the transfer of information in one direction only, either direction alternately, or both directions simultaneously. The secondary channel can for example include wired and wireless forms of communication.

"Band" or "Frequency Bandwidth" generally refer to a contiguous range of frequencies defined by an upper and lower frequency. Frequency bandwidth is thus typically expressed as a number of hertz (cycles per second) representing the difference between the upper frequency and the lower frequency of the band and may or may not include the upper and lower frequencies themselves. A "band" can therefore be defined by a given frequency bandwidth for a given region and designated with generally agreed on terms. For example, the "20 meter band" in the United States is assigned the frequency range from 14 MHz to 14.35 MHz thus defining a frequency bandwidth of 0.35 MHz or 350 KHz. In another example, the International Telecommunication Union (ITU) has designated the frequency range from 300 Mhz to 3 GHz as the "UHF band".

"Checksum" generally refers to data derived from a block of digital data for the purpose of detecting errors that may have been introduced during its transmission and/or storage. Typically, the checksum data is relatively small-sized. By themselves, checksums are often used to verify data integrity, but checksums are not typically relied upon to verify data authenticity. The procedure or process that generates the checksum from a data input is called a checksum function or checksum algorithm. Depending on the use case, a good checksum algorithm will usually output a significantly different value, even for small changes made to the data input. When the computed checksum for a data input matches the stored value of a previously computed checksum, the probability that the data has not been accidentally altered and/or corrupted is high. Some checksum algorithm techniques include parity byte, sum complement, and position-dependent algorithms. Check digits and parity bits are special cases of checksums that are usually appropriate for small blocks of data. Some error-correcting codes are based on special checksums which not only detect common errors, but the error correcting code in some cases further helps in the recovery of the original data.

"Command" or "Command Data" generally refers to one or more directives, instructions, algorithms, or rules controlling a machine to take one or more actions, alone or in combination. A command may be stored, transferred, transmitted, or otherwise processed in any suitable manner. For example, a command may be stored in a memory or transmitted over a communication network as electromagnetic radiation at any suitable frequency passing through any suitable medium.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, elements of the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum. In the case of a logical link, the communication links may be a conceptual linkage between the sender and recipient such as a transmission station in the receiving station. Logical link may include any combination of physical, electrical, electromagnetic, or other types of communication links.

"Communication Node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the Internet. Thus a computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above. A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible. Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Critical angle" generally refers to the highest angle with respect to a vertical line extending to the center of the Earth at which an electromagnetic wave at a specific frequency can be returned to the earth using skywave propagation.

"Critical Frequency" generally refers to the highest frequency that will be returned to the Earth when transmitted vertically under given ionospheric conditions using skywave propagation.

"Cyclic Redundancy Check" or "CRC" generally refers to an error-detecting code or technique to detect errors in digital data. For example, CRC is commonly used in digital networks and/or storage devices to detect accidental changes to raw data. CRC is based on binary division, and CRC is also sometimes referred to as polynomial code checksum. With CRC, blocks of data get encoded with or attached a short check value that is based on the remainder of a polynomial division of the contents of the blocks of data. During retrieval or decoding, the calculation is repeated. When the check values do not match, corrective action can be taken against data corruption. CRCs can be further used to facilitate error correction. The check or data verification value is a redundancy because it expands the message without adding information. CRCs can be simple to implement in binary hardware, easy to analyze mathematically, and are good at detecting common errors caused by noisy transmission channels. Given the check value has a fixed length, the function that generates the check value is sometimes used as a hash function.

"Data Bandwidth" generally refers to the maximum throughput of a logical or physical communication path in a communication system. Data bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the data bandwidth of a given digital communications network. Data networks may be rated according to their data bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz. Data bandwidth may also be characterized according to the maximum transfer rate for a particular communications network. For example:

"Low Data Bandwidth" generally refers to a communications network with a maximum data transfer rate that is less than or about equal to 1,000,000 units of data per second. For example, in a digital communications network, the unit of data is a bit. Therefore low data bandwidth digital communications networks are networks with a maximum transfer rate that is less than or about equal to 1,000,000 bits per second (1 Mbits/s).

"High Data Bandwidth" generally refers to a communications network with a maximum data transfer rate that is greater than about 1,000,000 units of data per second. For example, a digital communications network with a high data bandwidth is a digital communications network with a maximum transfer rate that is greater than about 1,000,000 bits per second (1 Mbits/s).

"Demodulation" generally refers to a process of extracting an original information-bearing signal from a carrier wave.

"Demodulator" or "Detector" generally refers to a device, such as an electronic circuit and/or computer, that extracts original information from a received modulated waveform based on one or more properties of the waveform. For example, these properties of the waveform can include amplitude, frequency, phase, and harmonics as well as other properties. After reception of the modulated carrier, the demodulator recovers the original modulating signal by the process of demodulation or detection. One or more modulators can be integrated with one or more demodulators to form a modulator-demodulator (modem). As such, the term demodulator may further refer to one or more parts, components, and/or software that demodulate within a modem.

"Electromagnet Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source. Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels. The photon is the quantum of the electromagnetic interaction and is the basic constituent of all forms of electromagnetic radiation. The quantum nature of light becomes more apparent at high frequencies as electromagnetic radiation behaves more like particles and less like waves as its frequency increases.

"Electromagnetic Spectrum" generally refers to the range of all possible frequencies of electromagnetic radiation.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to, radio waves, visible and invisible light, X-rays, and gamma-rays.

"Error Correction Code", "Error Correcting Code", or "ECC" generally refers to data and/or algorithms for expressing a sequence of numbers or other data such that any errors which are introduced can be detected and corrected within certain limitations based on the remaining numbers or data. ECC is typically used for controlling errors in data over unreliable and/or noisy communication channels. For instance, the sender encodes the message with a redundant in the form of an ECC. There are two main categories of ECCs, block codes and convolution codes. Some non-limiting examples of ECC codes include AN, BCH, Berger, constant-weight, convolutional, cyclic redundancy check (CRC), expander, group, Golay, Goppa, Hadamard, Hagelbarger, Hamming code, Latin square based, lexicographic, long, low-density parity-check (i.e., Gallager code), LT, polar, raptor, Reed-Solomon error correction, Reed-Muller, repeat-accumulate, repetition (e.g., triple modular redundancy), spinal, rateless, nonlinear, tornado, near-optimal erasure correcting, turbo code, and Walsh-Hadamard codes.

"Fiber-optic Communication" generally refers to a method of transmitting data from one place to another by sending pulses of electromagnetic energy through an optical fiber. The transmitted energy may form an electromagnetic carrier wave that can be modulated to carry data. Fiber-optic communication lines that use optical fiber cables to transmit data can be configured to have a high data bandwidth. For example, fiber-optic communication lines may have a high data bandwidth of up to about 15 Tbit/s, about 25 Tbit/s, about 100 Tbit/s, about 1 Pbit/s or more. Opto-electronic repeaters may be used along a fiber-optic communication line to convert the electromagnetic energy from one segment of fiber-optic cable into an electrical signal. The repeater can retransmit the electrical signal as electromagnetic energy along another segment of fiber-optic cable at a higher signal strength than it was received.

"Financial Instrument" generally refers to a tradable asset of any kind. General examples include, but are not limited to, cash, evidence of an ownership interest in an entity, or a contractual right to receive or deliver cash or another financial instrument. Specific examples include bonds, bills (e.g. commercial paper and treasury bills), stock, loans, deposits, certificates of deposit, bond futures or options on bond futures, short-term interest rate futures, stock options, equity futures, currency futures, interest rate swaps, interest rate caps and floors, interest rate options, forward rate agreements, stock options, foreign-exchange options, foreign-exchange swaps, currency swaps, or any sort of derivative.

"Forward Error Correction" or FEC generally refers to a technique used for controlling errors in data transmission over unreliable or noisy communication channels. Typically, but not always, a sender encodes the message in a redundant way by using an error-correction code (ECC). This redundancy allows a receiver to detect a limited number of errors that may occur anywhere in the message, and the redundancy often allows these errors to be corrected without retransmission. FEC gives the receiver the ability to correct errors without needing a reverse channel to request retransmission of data. However, higher forward channel bandwidth is typically required. FEC can be used in situations where retransmissions are costly or impossible, such as one-way communication links and when transmitting to multiple receivers in multicast. FEC is commonly used in modems. FEC information can also be added to mass storage devices to enable recovery of corrupted data. There are generally two types of FEC code categories, block codes and convolution codes. FEC block codes work on fixed-size blocks (or packets) of bits or symbols of predetermined size. Some non-limiting examples of block codes include Reed-Solomon, Golay, BCH, multidimensional parity, and Hamming codes. Typical block codes are usually decoded using hard-decision algorithms in which for every input and output signal a hard decision is made whether it corresponds to a one or a zero bit. Convolutional FEC codes work on bit or symbol streams of arbitrary length. Convolutional codes are typically decoded using soft-decision algorithms like the Viterbi, MAP or BCJR algorithms that process (discretized) analog signals, and which allow for much higher error-correction performance than hard-decision decoding. Convolutional FEC codes are most often soft decoded with the Viterbi algorithm, though other algorithms can be used. Viterbi decoding allows asymptotically optimal decoding efficiency with increasing constraint length of the convolutional code, but at the expense of exponentially increasing complexity. A convolutional code that is terminated is also a block code in that it encodes a block of input data, but the block size of a convolutional code is generally arbitrary, while block codes have a fixed size dictated by their algebraic characteristics. Types of termination for convolutional codes include tail-biting and bit-flushing. Some other non-limiting examples of FEC techniques include turbo coding, low density parity check (LDPC), interleaving, and local decoding. Many FEC coders (but not all) can also generate a bit-error rate (BER) signal which can be used as feedback to fine-tune the analog receiving electronics.

"Ground" is used more in an electrical/electromagnetic sense and generally refers to the Earth's surface including land and bodies of water, such as oceans, lakes, and rivers.

"Ground-wave Propagation" generally refers to a transmission method in which one or more electromagnetic waves are conducted via the boundary of the ground and atmosphere to travel along the ground. The electromagnetic wave propagates by interacting with the semi-conductive surface of the earth. In essence, the wave clings to the surfaces so as to follow the curvature of the earth. Typically, but not always, the electromagnetic wave is in the form of a ground or surface wave formed by low-frequency radio waves.

"Identifier" generally refers to a name that identifies (that is, labels the identity of) either a unique thing or a unique class of things, where the "object" or class may be an idea, physical object (or class thereof), or physical substance (or class thereof). The abbreviation "ID" often refers to identity, identification (the process of identifying), or an identifier (that is, an instance of identification). An identifier may or may not include words, numbers, letters, symbols, shapes, colors, sounds, or any combination of those. The words, numbers, letters, or symbols may follow an encoding system (wherein letters, digits, words, or symbols represent ideas or longer identifiers) or they may simply be arbitrary. When an identifier follows an encoding system, it is often referred to as a code or ID code. Identifiers that do not follow any encoding scheme are often said to be arbitrary IDs because they are arbitrarily assigned without meaning in any other context beyond identifying something.

"Intersymbol Interference" or "ISI" generally refers to a form of distortion of a signal in which one symbol interferes with subsequent symbols. Typically, but not always, ISI is an unwanted phenomenon as the previous symbols have a similar effect as noise which make communication less reliable. For example, the spreading of a pulse beyond the allotted time interval causes the pulse to interfere with neighboring pulses. ISI is usually, but not always, caused by multipath propagation and/or the inherent linear or non-linear frequency response of a communication channel causing successive symbols to blur together.

"Ionosphere" generally refers to the layer of the Earth's atmosphere that contains a high concentration of ions and free electrons and is able to reflect radio waves. The ionosphere includes the thermosphere as well as parts of the mesosphere and exosphere. The ionosphere extends from about 25 to about 600 miles (about 40 to 1,000 km) above the earth's surface. The ionosphere includes a number of layers that undergo considerable variations in altitude, density, and thickness, depending upon a number of factors including solar activity, such as sunspots.

"Jitter" generally refers to a variable delay in the receipt of a transmitted message. For example, jitter arises as messages arrive at an input at varying intervals, and as a result, the receiver of the message has to wait a variable time before a data slot is available for message transport.

"Latency" generally refers to the time interval between a cause and an effect in a system. Latency is physically a consequence of the limited velocity with which any physical interaction can propagate throughout a system. Latency is physically a consequence of the limited velocity with which any physical interaction can propagate. The speed at which an effect can propagate through a system is always lower than or equal to the speed of light. Therefore every physical system that includes some distance between the cause and the effect will experience some kind of latency. For example, in a communication link or communications network, latency generally refers to the minimum time it takes for data to pass from one point to another. Latency with respect to communications networks may also be characterized as the time it takes energy to move from one point along the network to another. With respect to delays caused by the propagation of electromagnetic energy following a particular propagation path, latency can be categorized as follows:

"Low Latency" generally refers to a period of time that is less than or about equal to a propagation time that is 10% greater than the time required for light to travel a given propagation path in a vacuum. Expressed as a formula, low latency is defined as follows:

$$\text{latency}_{low} \leq \frac{d}{c} \cdot k$$

where:

d=distance (miles)

c=the speed of light in a vacuum (186,000 miles/sec)

k=a scalar constant of 1.1

For example, light can travel 25,000 miles through a vacuum in about 0.1344 seconds. A "low latency" communication link carrying data over this 25,000 mile propagation path would therefore be capable of passing at least some portion of the data over the link in about 0.14784 seconds or less.

"High Latency" generally refers to a period of time that is over 10% greater than the time required for light to travel a given propagation path in a vacuum. Expressed as a formula, high latency is defined as follows:

$$\text{latency}_{high} > \frac{d}{c} \cdot k$$

where:

d=distance (miles)

c=the speed of light in a vacuum (186,000 miles/sec)

k=a scalar constant of 1.1

For example, light can travel 8,000 miles through a vacuum in about 0.04301 seconds. A "high latency" communication link carrying data over this transmission path would therefore be capable of passing at least some portion of the data over the link in about 0.04731 seconds or more.

The "high" and "low" latency of a network may be independent of the data bandwidth. Some "high" latency networks may have a high transfer rate that is higher than a "low" latency network, but this may not always be the case. Some "low" latency networks may have a data bandwidth that exceeds the bandwidth of a "high" latency network.

"Maximum Usable Frequency (MUF)" generally refers to the highest frequency that is returned to the earth using skywave propagation.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Message" generally refers to a discrete unit of communication intended by a source for consumption by a recipient or group of recipients.

"Modem" or "Modulator-Demodulator" generally refers to a device, such as an electronic circuit and/or computer, that performs the functions of modulation and demodulation of a signal such as through a modulator and a demodulator.

"Modulation" generally refers to the process of varying one or more properties of a periodic waveform, called the carrier signal, with a modulating signal that typically contains information to be transmitted.

"Modulator" generally refers to a device, such as an electronic circuit and/or computer, that varies one or more properties of a periodic waveform, called the carrier signal, with a modulating signal that typically contains information to be transmitted. For example, these properties of the waveform can include amplitude, frequency, phase, and harmonics as well as other properties. By way of a non-limiting example, the modulator can control the parameters of a high-frequency electromagnetic information carrier in accordance with electrical signals of the transmitted message. One or more modulators can be integrated with one or more demodulators to form a modulator-demodulator (modem). As such, the term modulator may further refer to one or more parts, components, and/or software that functions as a modulator within a modem.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Non-skywave propagation" generally refers to all forms of transmission, wired and/or wireless, in which the information is not transmitted by reflecting an electromagnetic wave from the ionosphere.

"Optical Fiber" generally refers to an electromagnetic waveguide having an elongate conduit that includes a substantially transparent medium through which electromagnetic energy travels as it traverses the long axis of the conduit. Electromagnetic radiation may be maintained within the conduit by total internal reflection of the electromagnetic radiation as it traverses the conduit. Total internal reflection is generally achieved using optical fibers that include a substantially transparent core surrounded by a second substantially transparent cladding material with a lower index of refraction than the core. Optical fibers are generally constructed of dielectric material that is not electrically conductive but is substantially transparent. Such materials may or may not include any combination of extruded glass such as silica, fluoride glass, phosphate glass, Chalcogenide glass, or polymeric material such as various types of plastic, or other suitable material and may be configured with any suitable cross-sectional shape, length, or dimension. Examples of electromagnetic energy that may be successfully passed through optical fibers include electromagnetic waves in the near-infrared, mid-infrared, and visible light portion of the electromagnetic spectrum, although electromagnetic energy of any suitable frequency may be used.

"Optimum Working Frequency" generally refers to the frequency that provides the most consistent communication path via skywave propagation. It can vary over time depending on number of factors, such as ionospheric conditions and time of day. For transmissions using the F2 layer of the ionosphere the working frequency is generally around 85% of the MUF, and for the E layer, the optimum working frequency will generally be near the MUF.

"Packet Error Rate" or "Packet Error Ratio" or "PER" generally refers to the number of incorrectly received data packets divided by the total number of received packets in a digital transmission. Generally, a packet is declared incorrect if at least one bit is erroneous.

"Polarization" generally refers to the orientation of the electric field ("E-plane") of a radiated electromagnetic energy wave with respect to the Earth's surface and is determined by the physical structure and orientation of the radiating antenna. Polarization can be considered separately from an antenna's directionality. Thus, a simple straight wire antenna may have one polarization when mounted substantially vertically, and a different polarization when mounted substantially horizontally. As a transverse wave, the magnetic field of a radio wave is at right angles to that of the electric field, but by convention, talk of an antenna's "polarization" is understood to refer to the direction of the electric field. Reflections generally affect polarization. For radio waves, one important reflector is the ionosphere which can change the wave's polarization. Thus for signals received via reflection by the ionosphere (a skywave), a consistent polarization cannot be expected. For line-of-sight communications or ground wave propagation, horizontally or vertically polarized transmissions generally remain in about the same polarization state at the receiving location. Matching the receiving antenna's polarization to that of the transmitter may be especially important in ground wave or line-of-sight propagation but may be less important in skywave propagation. An antenna's linear polarization is generally along the direction (as viewed from the receiving location) of the antenna's currents when such a direction can be defined. For instance, a vertical whip antenna or Wi-Fi antenna vertically oriented will transmit and receive in the vertical polarization. Antennas with horizontal elements, such as most rooftop TV antennas, are generally horizontally polarized (because broadcast TV usually uses horizontal polarization). Even when the antenna system has a vertical orientation, such as an array of horizontal dipole antennas, the polarization is in the horizontal direction corresponding to the current flow. Polarization is the sum of the E-plane orientations over time projected onto an imaginary plane perpendicular to the direction of motion of the radio wave. In the most general case, polarization is elliptical, meaning that the polarization of the radio waves varies over time. Two special cases are linear polarization (the ellipse collapses into a line) as discussed above, and circular polarization (in which the two axes of the ellipse are equal). In linear polarization the electric field of the radio wave oscillates back and forth along one direction; this can be affected by the mounting of the antenna but usually the desired direction is either horizontal or vertical polarization. In circular polarization, the electric field (and magnetic field) of the radio wave rotates at the radio frequency circularly around the axis of propagation.

"Primary Communication Channel" or "Primary Channel" generally refers to a communication pathway that is a first choice for transferring information. Typically, but not always, the primary communication channel has one or more properties, such as latency or bandwidth, that is desirable over others. For example, a primary communication channel can have the highest data rate of all the channels sharing a common interface. A primary communication channel may support the transfer of information in one direction only, either direction alternately, or both directions simultaneously. The primary communication channel can for example include wired and wireless forms of communication.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. A processor also includes an Application-Specific Integrated Circuit (ASIC). An ASIC is an Integrated Circuit (IC) customized to perform a specific series of logical operations in controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured. In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). An FPGA may be reprogrammed using another computer to reconfigure the FPGA to implement a new set of commands or operating instructions. Such an operation may be executed in any suitable means such as by a firmware upgrade to the processor circuitry. Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Radio" generally refers to electromagnetic radiation in the frequencies that occupy the range from 3 kHz to 300 GHz.

"Radio Horizon" generally refers to the locus of points at which direct rays from an antenna are tangential to the ground. The radio horizon can be approximated by the following equation:

$$d=\sqrt{2h_t}+\sqrt{2h_r}$$

where:

d=radio horizon (miles)

$h_t$=transmitting antenna height (feet)

$h_r$=receiving antenna height (feet).

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiving Station" generally refers to a receiving device, or to a location facility having multiple devices configured to receive electromagnetic energy. A receiving station may be configured to receive from a particular transmitting entity, or from any transmitting entity regardless of whether the transmitting entity is identifiable in advance of receiving the transmission.

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Satellite Communication" or "Satellite Propagation" generally refers to transmitting one or more electromagnetic signals to a satellite which in turn reflects and/or retransmits the signal to another satellite or station.

"Signal-to-noise ratio" or "SNR" or "S/N" generally refers to a measure that compares a level of a desired signal to a level of background noise. SNR is calculated as the ratio of signal power to noise power, often expressed in decibels. A SNR higher than 1:1 (greater than 0 dB) indicates more signal than noise.

"Size" generally refers to the extent of something; a thing's overall dimensions or magnitude; how big something is. For physical objects, size may be used to describe relative terms such as large or larger, high or higher, low or lower, small or smaller, and the like. Size of physical objects may also be given in fixed units such as a specific width, length, height, distance, volume, and the like expressed in any suitable units. For data transfer, size may be used to indicate a relative or fixed quantity of data being manipulated, addressed, transmitted, received, or processed as a logical or physical unit. Size may be used in conjunction with the amount of data in a data collection, data set, data file, or other such logical unit. For example, a data collection or data file may be characterized as having a "size" of 35 Mbytes, or a communication link may be characterized as having a data bandwidth with a "size" of 1000 bits per second.

"Skip distance" generally refers to the minimum distance from a transmitter to where a wave from skywave propagation can be returned to the Earth. To put it another way, the skip distance is the minimum distance that occurs at the critical angle for skywave propagation.

"Skip Zone" or "Quiet Zone" generally refers to an area between the location where a ground wave from ground wave propagation is completely dissipated and the location where the first skywave returns using skywave propagation. In the skip zone, no signal for a given transmission can be received.

"Skywave Propagation" refers generally to a transmission method in which one or more electromagnetic-waves radiated from an antenna are refracted from the ionosphere back to the ground. Skywave propagation further includes tropospheric scatter transmissions. In one form, a skipping method can be used in which the waves refracted from the ionosphere are reflected by the ground back up to the ionosphere. This skipping can occur more than once.

"Software-Defined Radio" or "SDR" generally refers to a radio communication system where components that have been traditionally implemented in hardware are instead implemented via software on a computer and/or embedded system. Some examples of hardware now implemented as SDR are mixers, filters, amplifiers, modulators/demodulators, detectors, and equalizers, just to name a few.

"Space-wave Propagation" or sometimes referred to as "Direct Wave Propagation" or "Line-of-sight Propagation" generally refers to a transmission method in which one or more electromagnetic waves are transmitted between antennas that are generally visible to one another. The transmission can occur via direct and/or ground reflected space waves. Generally speaking, the antenna height and curvature of the earth are limiting factors for the transmission distances for space-wave propagation. The actual radio horizon for a direct line of sight is larger than the visible or geometric line of sight due to diffraction effects; that is, the radio horizon is about 4/5 greater than the geometric line of sight.

"Spread Spectrum" generally refers to a transmission method that includes sending a portion of a transmitted signal over multiple frequencies. The transmission over multiple frequencies may occur simultaneously by sending a portion of the signal on various frequencies. In this example, a receiver must listen to all frequencies simultaneously in order to reassemble the transmitted signal. The transmission may also be spread over multiple frequencies by "hopping" signals. A signal hopping scenario includes transmitting the signal for some period of time over a first frequency, switching to transmit the signal over a second frequency for a second period of time, before switching to a third frequency for a third period of time, and so forth. The receiver and transmitter must be synchronized in order to switch frequencies together. This process of "hopping" frequencies may be implemented in a frequency-hopping pattern that may change over time (e.g. every hour, every 24 hours, and the like).

"Stratosphere" generally refers to a layer of the earth's atmosphere extending from the troposphere to about 25 to 35 miles above the earth surface.

"Symbol" generally refers to a waveform, a state or a significant condition of the communication channel that persists, for a fixed period of time. For digital baseband transmissions, a symbol may be in the form of a pulse, and a symbol may be in the form of a tone in passband transmissions using modems. A transmitter or other device places symbols on one or more channels, and the receiver detects the sequence of symbols in order to reconstruct the transmitted data. In some cases, there may be a direct correspondence between a symbol and a small unit of data. For instance, each symbol can encode one or several bits. The data may also be represented by the transitions between symbols, and/or by a sequence of several symbols.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Transfer Rate" generally refers to the rate at which something is moved from one physical or logical location to another. In the case of a communication link or communication network, a transfer rate may be characterized as the rate of data transfer over the link or network. Such a transfer rate may be expressed in "bits per second" and may be limited by the maximum data bandwidth for a given network or communication link used to carry out a transfer of data.

"Transmission Line" generally refers to a specialized physical structure or series of structures designed to carry electromagnetic energy from one location to another, usually without radiating the electromagnetic energy through free space. A transmission line operates to retain and transfer electromagnetic energy from one location to another while minimizing latency and power losses incurred as the electromagnetic energy passes through the structures in the transmission line. Examples of transmission lines that may be used in communicating radio waves include twin lead, coaxial cable, microstrip, strip line, twisted-pair, star quad, lecher lines, various types of waveguide, or a simple single wire line. Other types of transmission lines such as optical fibers may be used for carrying higher frequency electromagnetic radiation such as visible or invisible light.

"Transmission Path" or "Propagation Path" generally refers to a path taken by electromagnetic energy passing through space or through a medium. This can include transmissions through a transmission line. In this case, the transmission path is defined by, follows, is contained within, passes through, or generally includes the transmission line. A transmission or propagation path need not be defined by a transmission line. A propagation or transmission path can be defined by electromagnetic energy moving through free space or through the atmosphere such as in skywave, ground wave, line-of-sight, or other forms of propagation. In that case, the transmission path can be characterized as any path along which the electromagnetic energy passes as it is moves from the transmitter to the receiver, including any skip, bounce, scatter, or other variations in the direction of the transmitted energy.

"Transmission Station" generally refers to a transmitting device, or to a location or facility having multiple devices configured to transmit electromagnetic energy. A transmission station may be configured to transmit to a particular receiving entity, to any entity configured to receive transmission, or any combination thereof.

"Transmission Time" generally refers to is the amount of time from the beginning until the end of a message transmission in a communication network. In the case of a digital message, the transmission time is the time from the first bit until the last bit of a message has left the transmitting node. For a digital packet, the packet transmission time can be obtained from the packet size and bit rate. The transmission time should not be confused with propagation delay which refers to the time it takes for the first bit to travel from a sender to a receiver.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Triggering Data" generally refers to data that includes triggering information identifying one or more commands to execute. The triggering data and the command data may occur together in a single transmission or may be transmitted separately along a single or multiple communication links.

"Troposphere" generally refers to the lowest portion of the earth's atmosphere. The troposphere extends about 11 miles above the surface of the earth in the mid-latitudes, up to 12 miles in the tropics, and about 4.3 miles in winter at the poles.

"Tropospheric Scatter Transmission" generally refers to a form of skywave propagation in which one or more electromagnetic waves, such as radio waves, are aimed at the troposphere. While not certain as to its cause, a small amount of energy of the waves is scattered forwards to a receiving antenna. Due to severe fading problems, diversity reception techniques (e.g., space, frequency, and/or angle diversity) are typically used.

"Wave Guide" generally refers to a transmission line configured to guides waves such as electromagnetic waves occurring at any frequency along the electromagnetic spectrum. Examples include any arrangement of conductive or insulative material configured to transfer lower frequency electromagnetic radiation ranging along the electromagnetic spectrum from extremely low frequency to extremely high frequency waves. Others specific examples include optical fibers guiding high-frequency light or hollow conductive metal pipe used to carry high-frequency radio waves, particularly microwaves.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | communication system |
| 105 | information source |
| 110 | information destination |
| 115 | communication channels |
| 120 | primary communication channel |
| 125 | backend communication channel |
| 130 | distance |
| 135 | primary channel latency |
| 140 | primary channel bandwidth |
| 145 | backend channel latency |
| 150 | backend channel bandwidth |
| 200 | communication system |
| 204 | low latency, low bandwidth communication link |
| 208 | high latency, high bandwidth communication link |
| 212 | first communication node |
| 216 | second communication node |
| 220 | atmosphere |
| 224 | electromagnetic waves |
| 228 | transmitting antenna |
| 232 | receiving antenna |
| 236 | transmission line |
| 240 | transmission line |
| 244 | transmission line |
| 252 | repeaters |
| 256 | earth |
| 260 | client |
| 264 | connection |
| 266 | wireless connection |
| 268 | instruction processor |
| 272 | connection |
| 405 | modulator |
| 410 | radio transmitter |
| 415 | fiber optic transmitter |
| 420 | fiber optic cable |
| 425 | demodulator |
| 430 | radio receiver |
| 435 | fiber optic receiver |
| 500 | communication system |
| 505 | transmitter data network |
| 510 | receiver data network |
| 600 | flowchart |
| 605 | stage |
| 610 | stage |
| 615 | stage |
| 620 | stage |

-continued

| Reference Numbers | |
|---|---|
| 700 | flowchart |
| 705 | stage |
| 710 | stage |
| 715 | stage |
| 720 | stage |
| 725 | stage |
| 730 | stage |
| 735 | stage |
| 800 | message group table structure |
| 900 | message group table structure |
| 1000 | message group table structure |
| 1100 | flowchart |
| 1105 | stage |
| 1110 | stage |
| 1115 | stage |
| 1120 | stage |
| 1125 | stage |
| 1130 | stage |
| 1200 | diagram |
| 1205 | stage |
| 1210 | stage |
| 1215 | stage |
| 1220 | stage |
| 1225 | stage |
| 1230 | stage |
| 1235 | stage |
| 1240 | stage |
| 1245 | stage |
| 1250 | stage |
| 1300 | decoder system |
| 1305 | unframed demodulator data output |
| 1310 | decoders |
| 1315 | priority decoder |
| 1320 | shortest length decoder |
| 1325 | intermediate length decoder |
| 1330 | longest length decoder |
| 1400 | diagram |
| 1405 | stage |
| 1410 | stage |
| 1415 | stage |
| 1420 | stage |
| 1425 | stage |
| 1430 | stage |

What is claimed is:

1. A method, comprising:

creating a message code table that includes message groups with different message lengths;

assigning higher preference messages to shorter message length groups and lower preference messages to longer message length groups;

wherein the higher preference messages concern financial trading instructions that have a higher financial benefit than the lower preference messages;

communicating messages having variable lengths over a communication channel;

wherein the communication channel includes a skywave propagation channel;

wherein said communicating includes transmitting the messages from a transmitter to a receiver;

wherein the receiver located past a radio horizon for the transmitter; and wherein the skywave propagation channel includes at least one skin zone between the transmitter and the receiver.

2. The method of claim 1, further comprising:

wherein preference is based at least on probability that an instruction will be sent;

wherein the preference is based at least on financial benefit of the instruction;

communicating the message code table to a receiver for the messages; and transmitting the message code table over a high latency, high bandwidth channel.

3. The method of claim 2, further comprising:

wherein the message code table is created in at least part by a computer at a transmitter; and transmitting the messages using a low latency, low bandwidth channel.

4. The method of claim 2, wherein the message code table is created in at least part by a computer at a receiver, the communication channel includes a primary channel, and the primary communication channel includes a high frequency radio channel.

5. The method of claim 1, further comprising:

selecting a financial trading strategy;

developing a set of trading commands based on the financial trading strategy;

estimating probabilities that the trading commands will be issued;

assigning highest probability trading commands to a shortest message group; and assigning next priority commands to a next longer message group that has message lengths longer than the shortest message group.

6. A method, comprising:

developing a set of trading instructions based on a financial trading strategy, wherein the set of trading instructions include higher preference instructions and lower preference instructions;

encoding the higher preference instructions to shorter message length groups and the lower preference instructions to longer message length groups, wherein the shorter message length groups have message lengths shorter than the longer message length groups;

communicating messages having variable lengths based on said encoding over a communication channel;

wherein the messages having the variable lengths are from the shorter message length groups and the longer message length groups;

wherein the communication channel includes a skywave preparation channel;

wherein said communicating includes transmitting the messages from a transmitter to a receiver; and wherein the skywave propagation channel includes at least one skip zone between the transmitter and the receiver.

7. The method of claim 6, wherein the higher preference instructions have a greater probability of being sent than the lower preference instructions.

8. The method of claim 6, wherein the preference is based at least on financial benefit of the message.

9. The method of claim 6, further comprising:

communicating the messages using skywave propagation.

10. The method of claim 6, wherein the communication channel includes a primary channel, and the primary communication channel includes a high frequency radio channel.

11. The method of claim 6, wherein the communication channel includes a backend channel.

12. The method of claim 6, further comprising:

encoding the messages with the variable lengths with at least an error correction code;

wherein the messages with the variable lengths include at least forward error correction (FEC);

wherein the messages with the variable lengths include at least a checksum;

wherein the messages with the variable lengths include at least a cyclic redundancy check (CRC);

appending a newly received symbol for one of the messages to previously received symbols;

decoding the messages using forward error correction (FEC) and cyclic error correction (CRC); and wherein the messages concern one or more high-speed financial trading transactions.

13. The method of claim 6, further comprising:

increasing error correction overhead for the messages;

providing higher degree of error protection by increasing error correction overhead; and reducing false positives by limiting forward error correction (FEC) to declaring instead of correcting more symbols than a maximum limit.

14. A method, comprising:

developing a set of trading commands based on a financial trading strategy;

estimating probabilities that the trading commands will be issued;

assigning highest probability trading commands to a shortest message group;

assigning next priority commands to a next longer message group that has message lengths longer than the shortest message group;

creating a message code table that includes the shortest message group and the next longer message group;

communicating messages having variable lengths based on the message code table over a communication channel from a transmitter to a receiver;

wherein the communication channel includes a skywave propagation channel;

wherein the skywave propagation channel includes at least one skip zone;

wherein the receiver is located past a radio horizon for the transmitter; and decoding the messages without knowledge of length and timing of the messages.

15. The method of claim 14, further comprising:

decoding one of the messages using forward error correction (FEC); and determining one of the messages is valid based on a validity of a checksum for the message.

16. The method of claim 14, further comprising:

decoding the messages using forward error correction (FEC) and cyclic error correction (CRC).

17. The method of claim 16, further comprising:

decoding the messages in a serial manner by cycling through larger message groups.

18. The method of claim 16, further comprising:

decoding the messages in a parallel manner by analyzing all potential message group lengths simultaneously.

19. The method of claim 14, further comprising:

decoding the messages in which higher use probability messages are encoded to have a shorter length as compared to lower use probability messages; and wherein the messages concern one or more high-speed financial trading transactions.

* * * * *

UNITED STATES PATENT AND TRADEMARK OFFICE

CERTIFICATE OF CORRECTION

PATENT NO. : 11,923,972 B2
APPLICATION NO. : 17/806444
DATED : March 5, 2024
INVENTOR(S) : Kevin J. Babich and Terry Lee Vishloff It is certified that error appears in the above-identified patent and that said Letters Patent is hereby corrected as shown below:

In the Claims

Column 40, Claim 1, Lines 58-59, replace "wherein the receiver located past a radio horizon for the transmitter; and" with --wherein the receiver is located past a radio horizon for the transmitter; and--

Column 40, Claim 1, Lines 60-63, replace "wherein the skywave propagation channel includes at least one skin zone between the transmitter and the receiver." with --wherein the skywave propagation channel includes at least one skip zone between the transmitter and the receiver.--

Column 41, Lines 42-43, replace "wherein the communication channel includes a skywave preparation channel;" with --wherein the communication channel includes a skywave propagation channel;--

Signed and Sealed this
Twenty-third Day of April, 2024

Katherine Kelly Vidal

Katherine Kelly Vidal
*Director of the United States Patent and Trademark Office*